(12) United States Patent
Torii et al.

(10) Patent No.: US 12,552,394 B2
(45) Date of Patent: Feb. 17, 2026

(54) DRIVING SKILL EVALUATION METHOD, DRIVING SKILL EVALUATION SYSTEM, AND NON-TRANSITORY RECORDING MEDIUM

(71) Applicant: SUBARU CORPORATION, Tokyo (JP)

(72) Inventors: Takeshi Torii, Tokyo (JP); Noeru Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 72 days.

(21) Appl. No.: 18/716,843

(22) PCT Filed: Oct. 31, 2022

(86) PCT No.: PCT/JP2022/040769
§ 371 (c)(1),
(2) Date: Jun. 5, 2024

(87) PCT Pub. No.: WO2024/095331
PCT Pub. Date: May 10, 2024

(65) Prior Publication Data
US 2025/0050890 A1 Feb. 13, 2025

(51) Int. Cl.
*B60W 40/09* (2012.01)
*G06V 10/75* (2022.01)
*G06V 20/59* (2022.01)

(52) U.S. Cl.
CPC .......... *B60W 40/09* (2013.01); *G06V 10/751* (2022.01); *G06V 20/597* (2022.01);
(Continued)

(58) Field of Classification Search
CPC .......... B60W 40/09; B60W 2420/403; B60W 2520/125; B60W 2520/14;
(Continued)

(56) References Cited

U.S. PATENT DOCUMENTS

2012/0232741 A1* 9/2012 Sekiyama ............ G07C 5/0816
701/29.1
2014/0212849 A1* 7/2014 Naiwala ............... G09B 19/167
434/66
(Continued)

FOREIGN PATENT DOCUMENTS

CN 108995653 A * 12/2018 ............ B60W 40/09
JP 2020-019289 A 2/2020

OTHER PUBLICATIONS

International Search Report received in PCT Application No. PCT/JP2022/040769, dated Jan. 17, 2023.

*Primary Examiner* — Ryan W Sherwin
(74) *Attorney, Agent, or Firm* — Rimon P.C.

(57) ABSTRACT

A driving skill evaluation method according to one embodiment of the disclosure includes: generating a kernel density estimation image, based on time-series data of a first parameter corresponding to a direction change in a traveling direction of a vehicle, and time-series data of a second parameter indicating a square of a jerk in the traveling direction of the vehicle; and evaluating a driving skill of a driver of the vehicle, by comparing the kernel density estimation image with a reference image.

11 Claims, 17 Drawing Sheets

(52) U.S. Cl.
CPC . *B60W 2420/403* (2013.01); *B60W 2520/125* (2013.01); *B60W 2520/14* (2013.01)

(58) Field of Classification Search
CPC ....... B60W 2420/905; B60W 2520/10; B60W 2520/105; G06V 10/751; G06V 20/597
See application file for complete search history.

(56) References Cited

U.S. PATENT DOCUMENTS

| | | | |
|---|---|---|---|
| 2020/0013173 A1* | 1/2020 | Lee | G06T 7/269 |
| 2020/0031359 A1 | 1/2020 | Suzuki | |
| 2020/0057487 A1* | 2/2020 | Sicconi | G06F 3/011 |
| 2020/0356773 A1* | 11/2020 | Goyal | G06V 20/582 |
| 2023/0219569 A1* | 7/2023 | Zhao | B60W 60/001 |
| | | | 701/23 |
| 2024/0270267 A1* | 8/2024 | Miyamichi | G07C 5/00 |
| 2025/0171029 A1* | 5/2025 | Aggarwal | B60W 30/18163 |

* cited by examiner

[ FIG. 1 ]
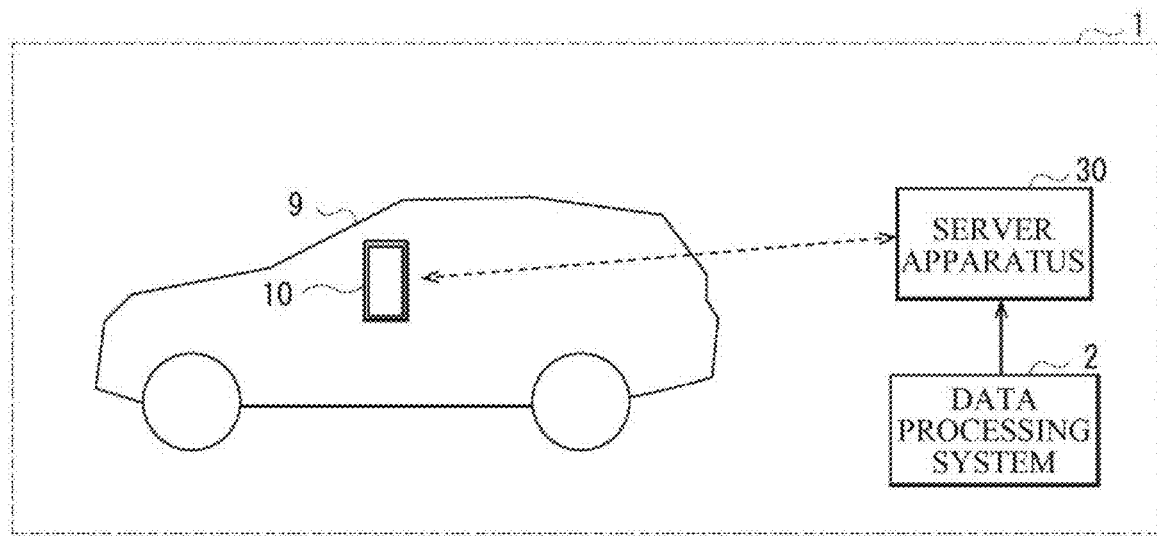
[ FIG. 2 ]
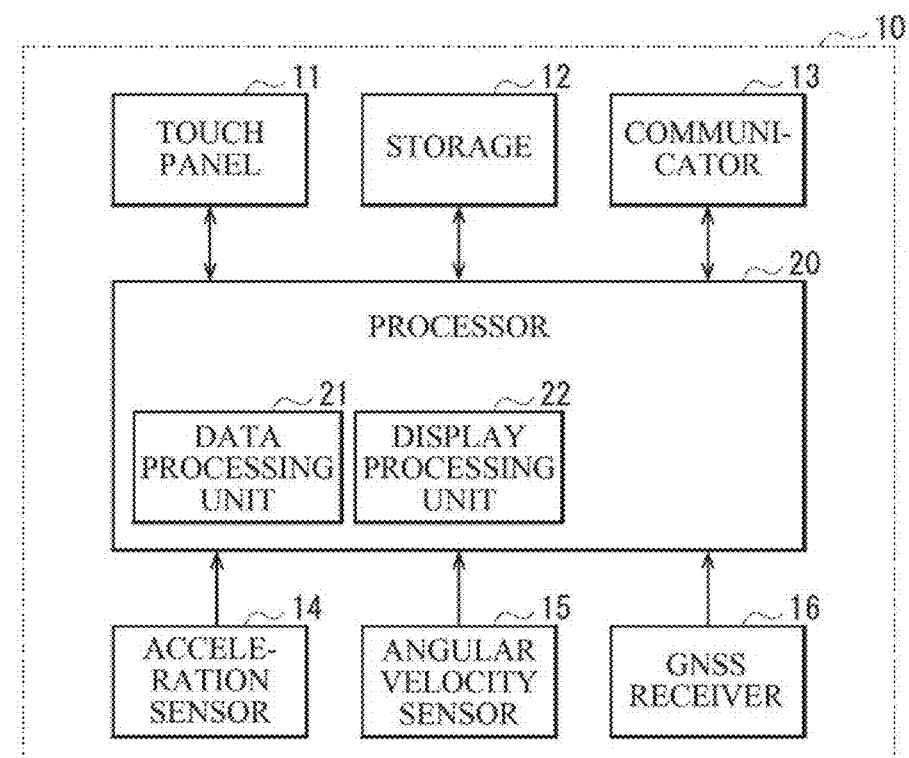

[FIG. 3]
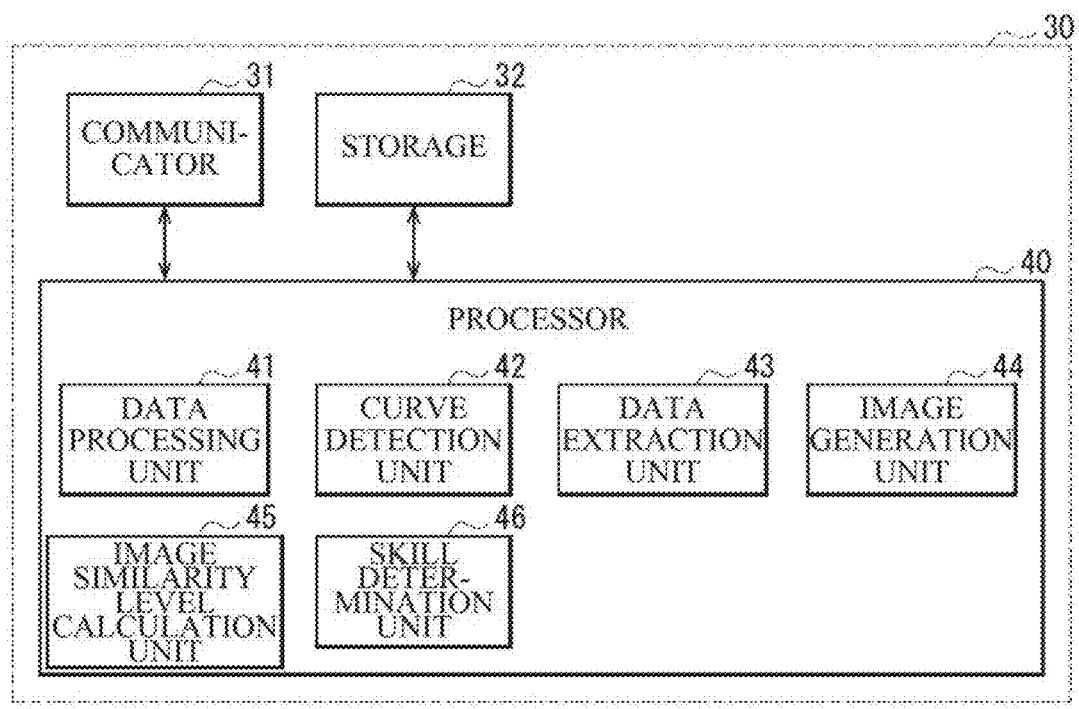
[FIG. 4]
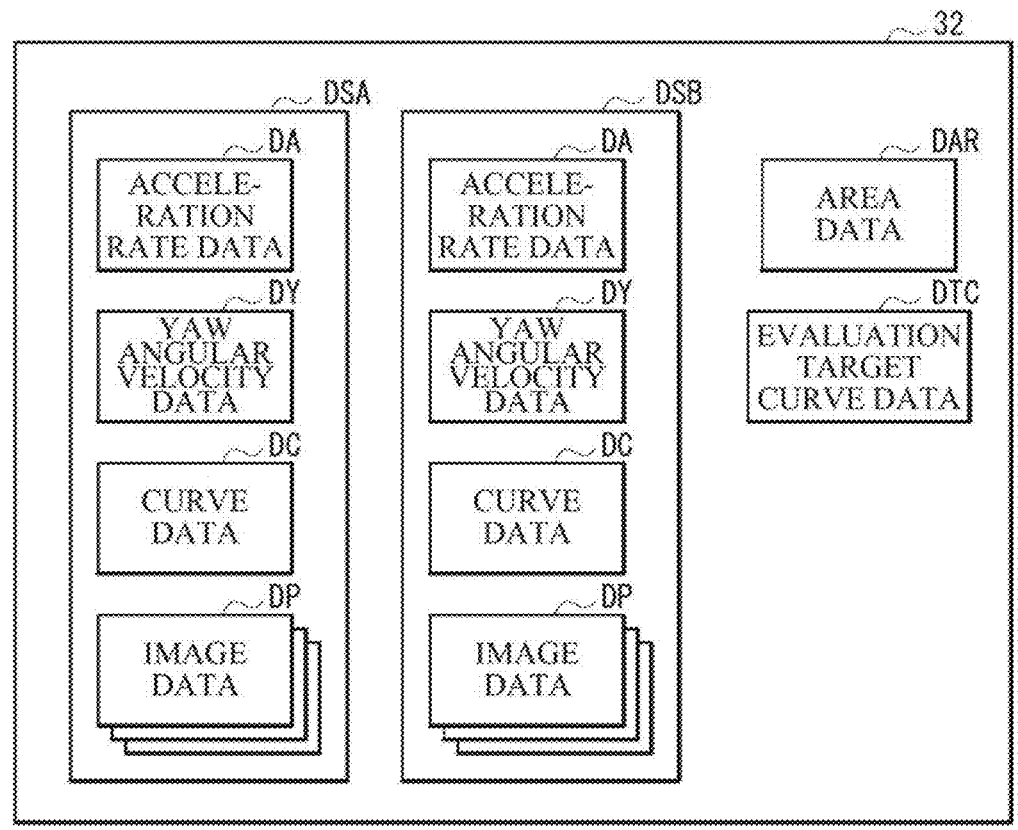

[ FIG. 5 ]
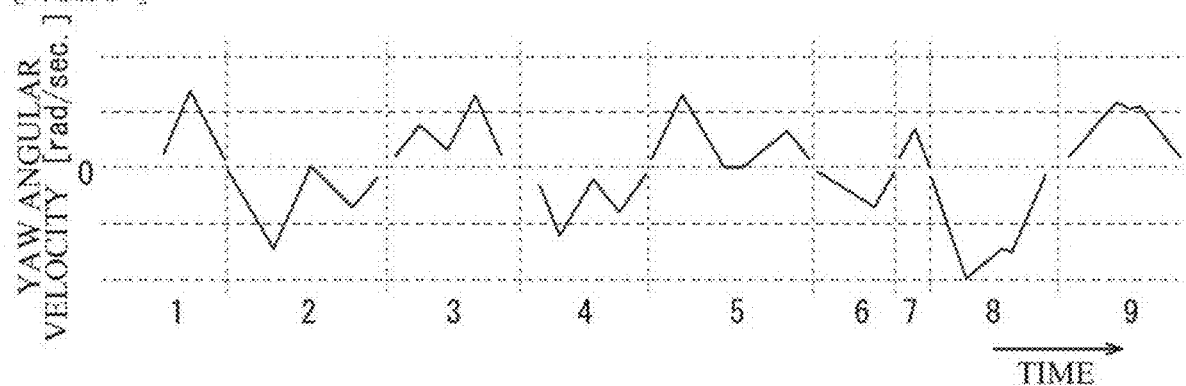
[ FIG. 6 ]
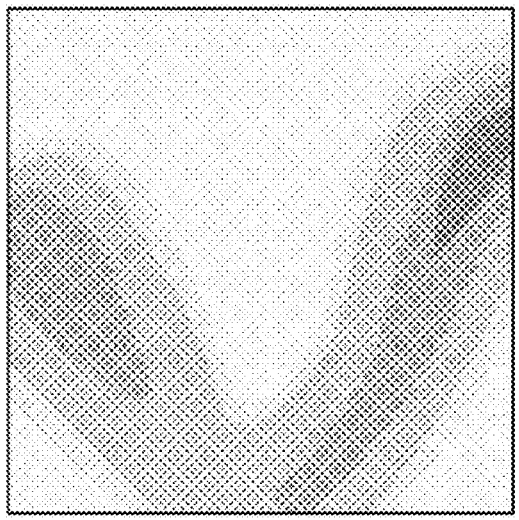
[ FIG. 7 ]
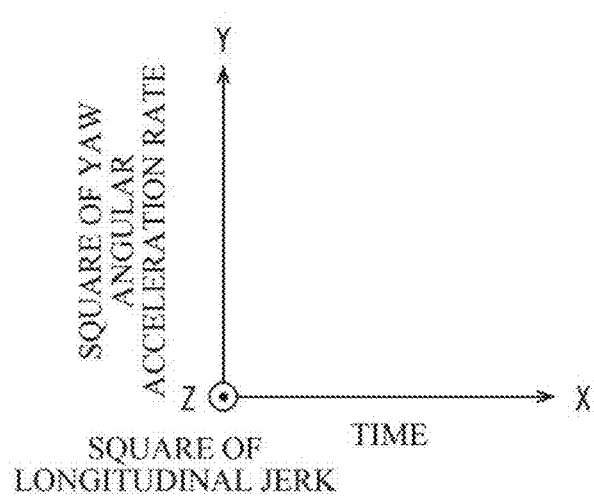

[ FIG. 8 ]
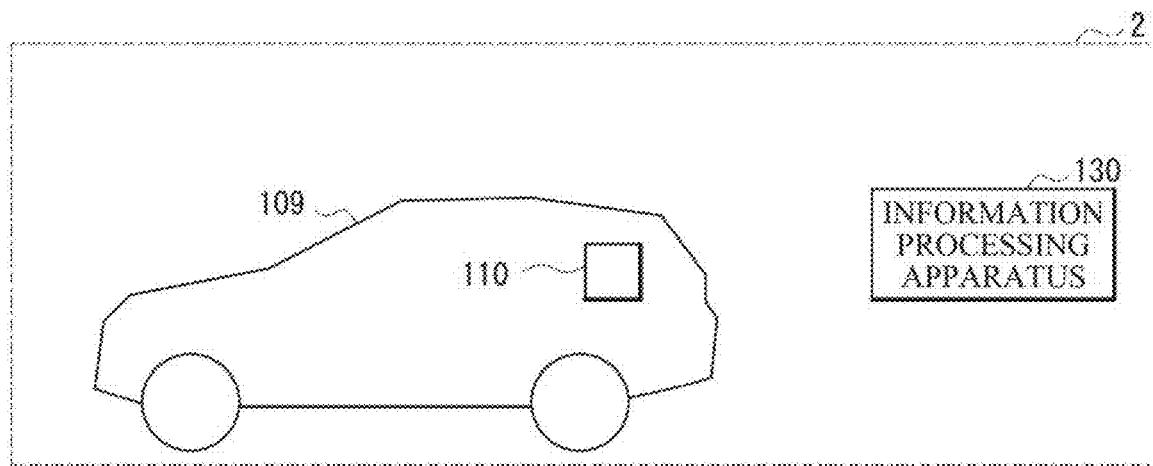
[ FIG. 9 ]
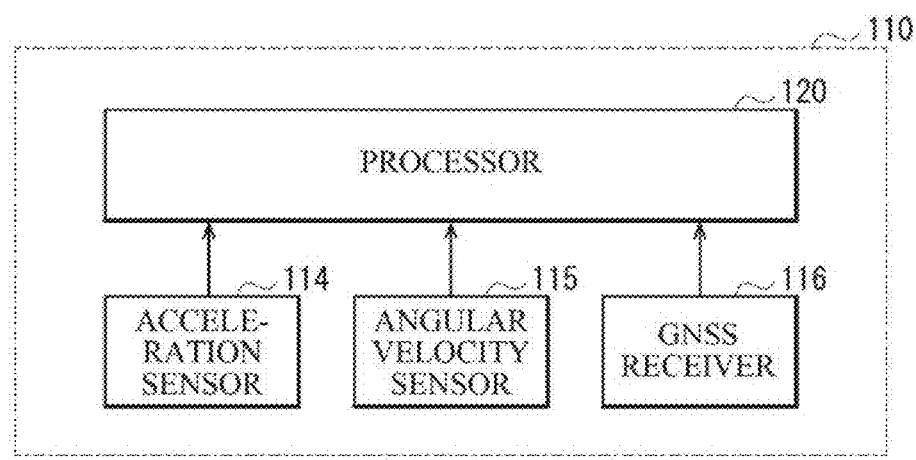

[ FIG. 10 ]
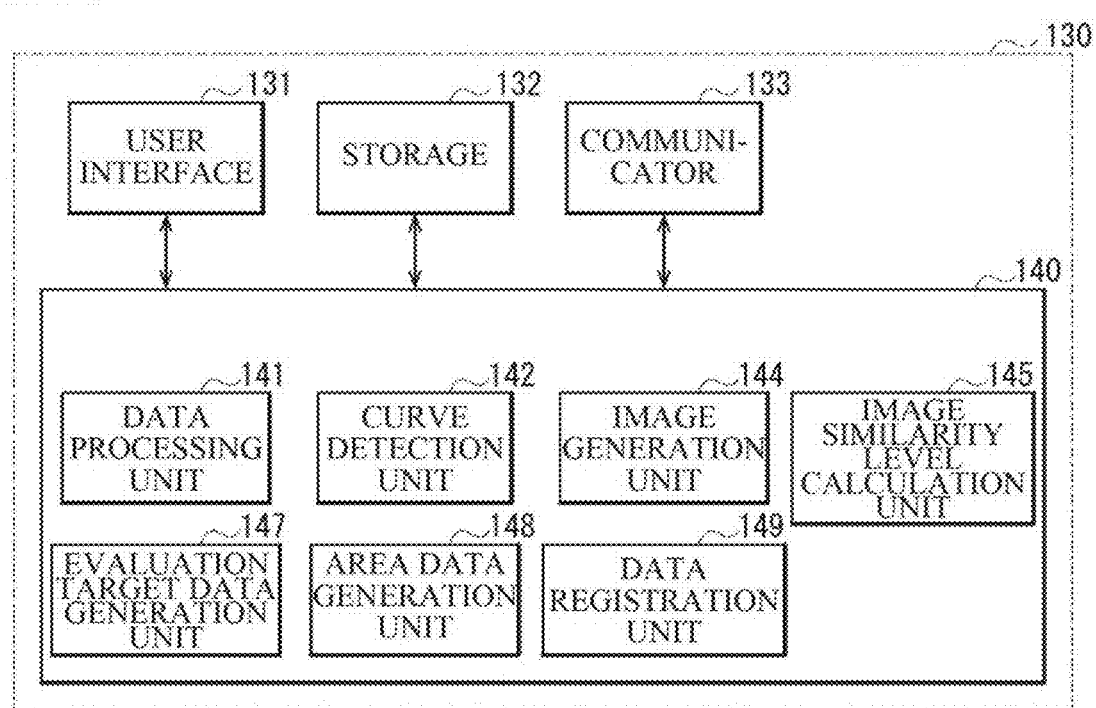

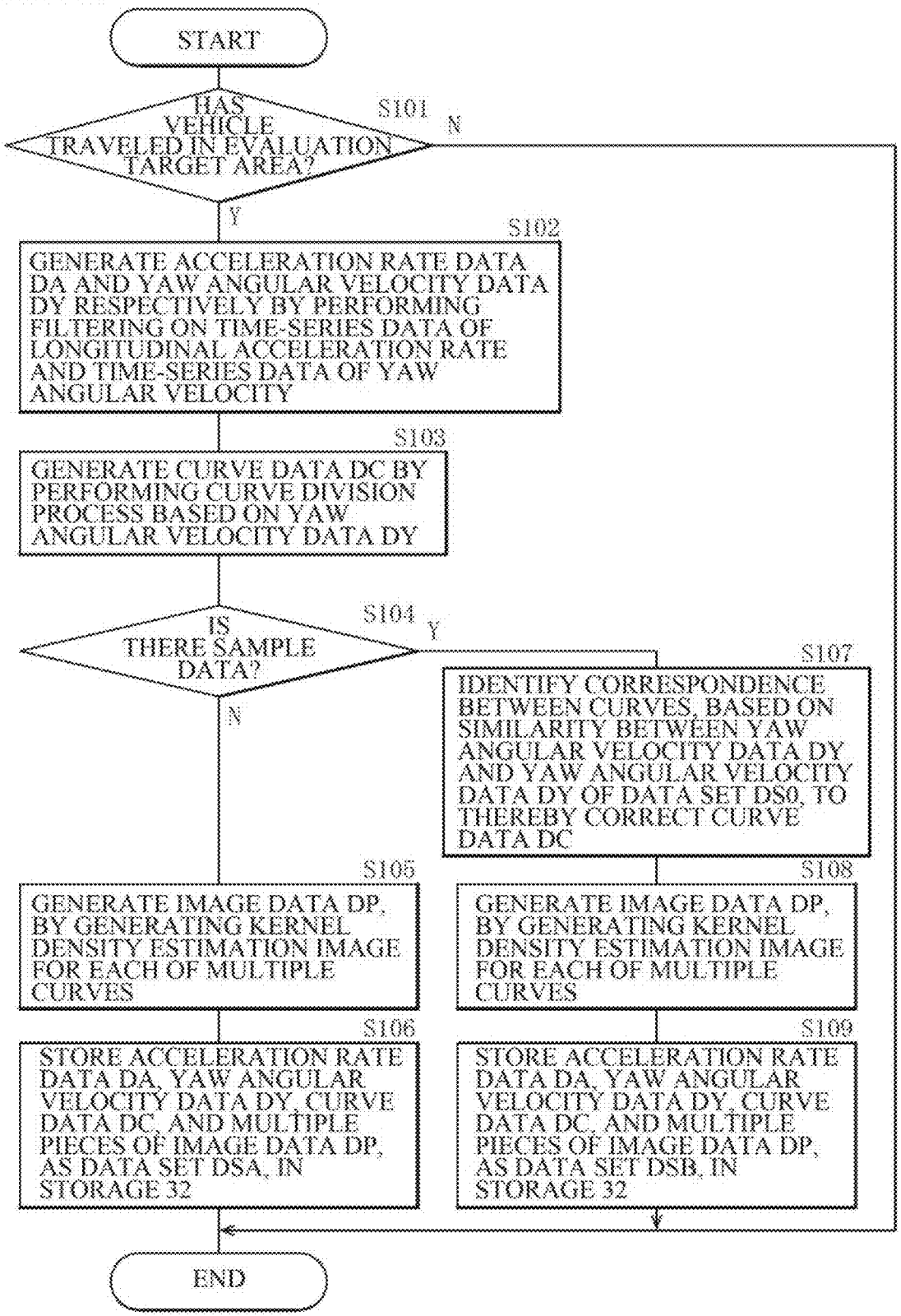

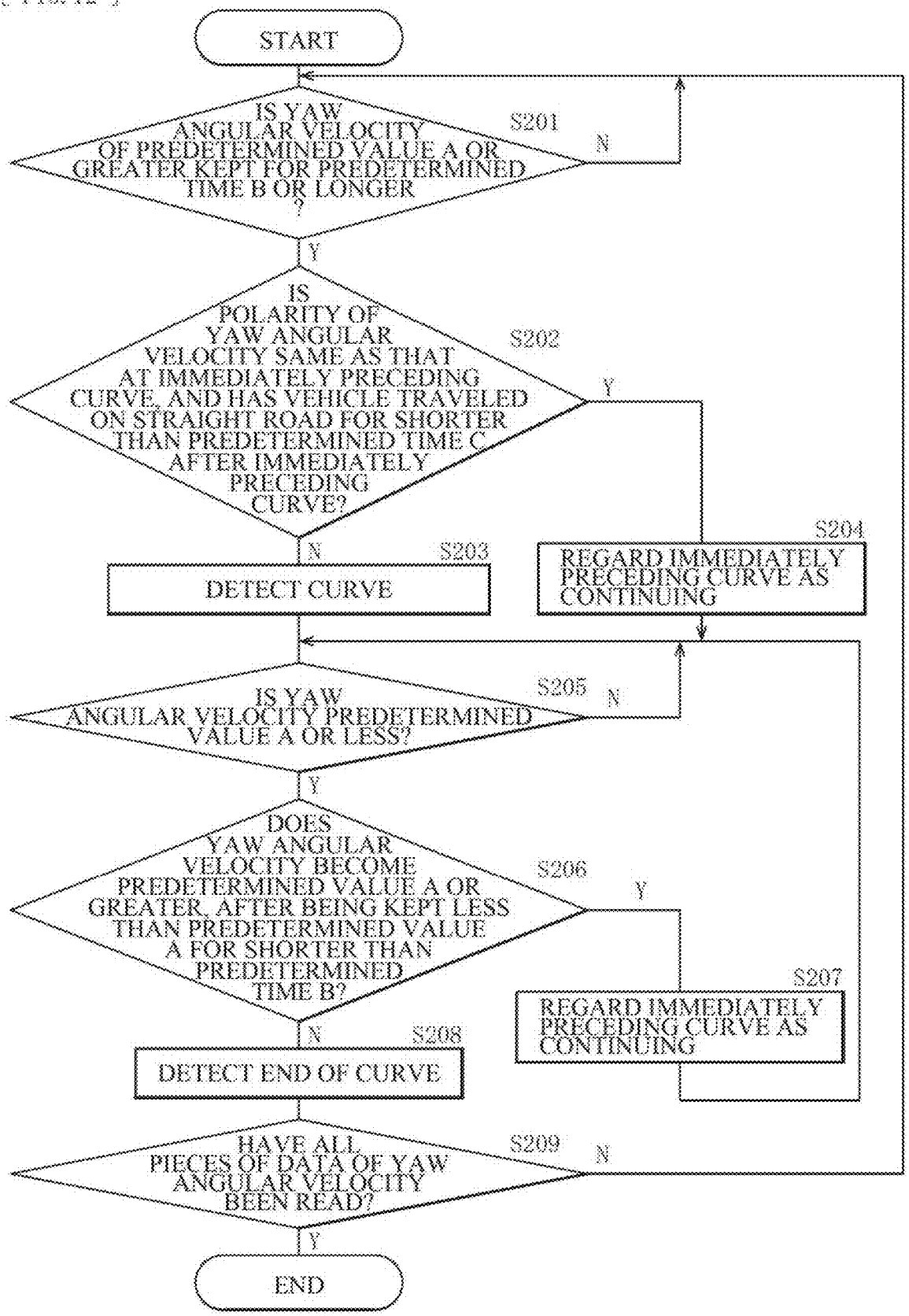

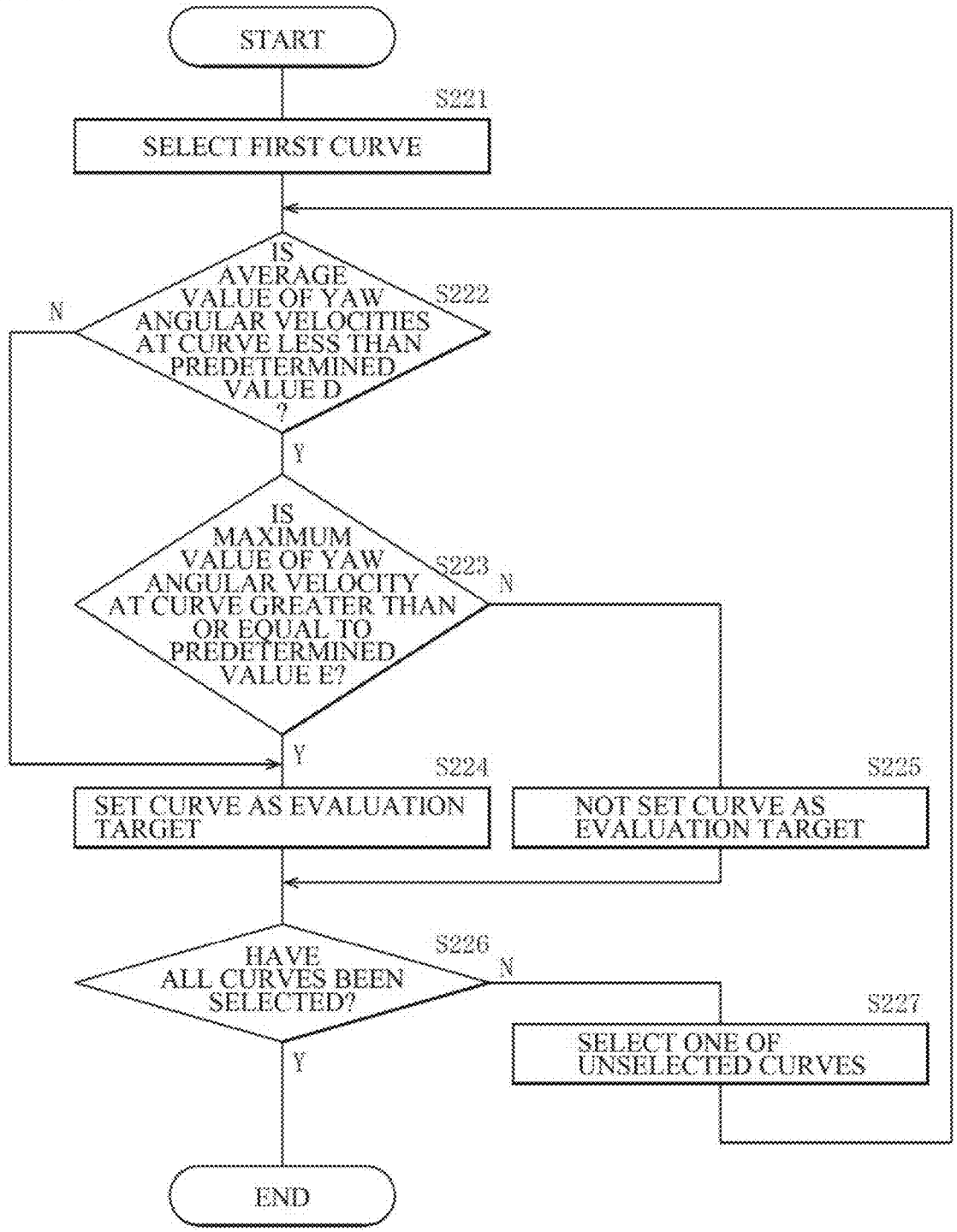
[ FIG. 13 ]

[ FIG. 14 ]
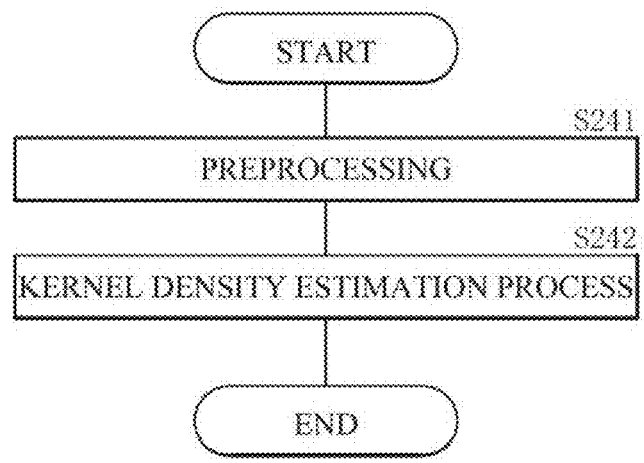
[ FIG. 15 ]
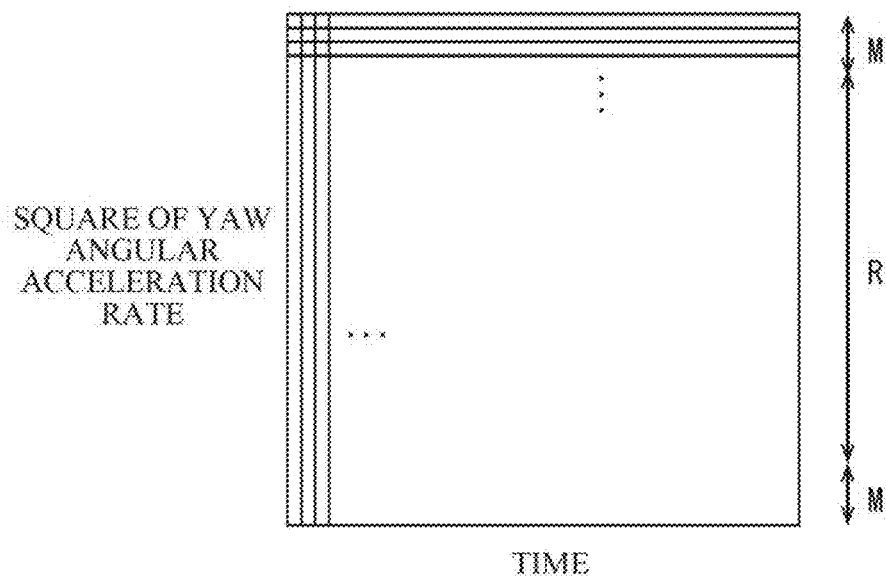

[ FIG. 16 ]
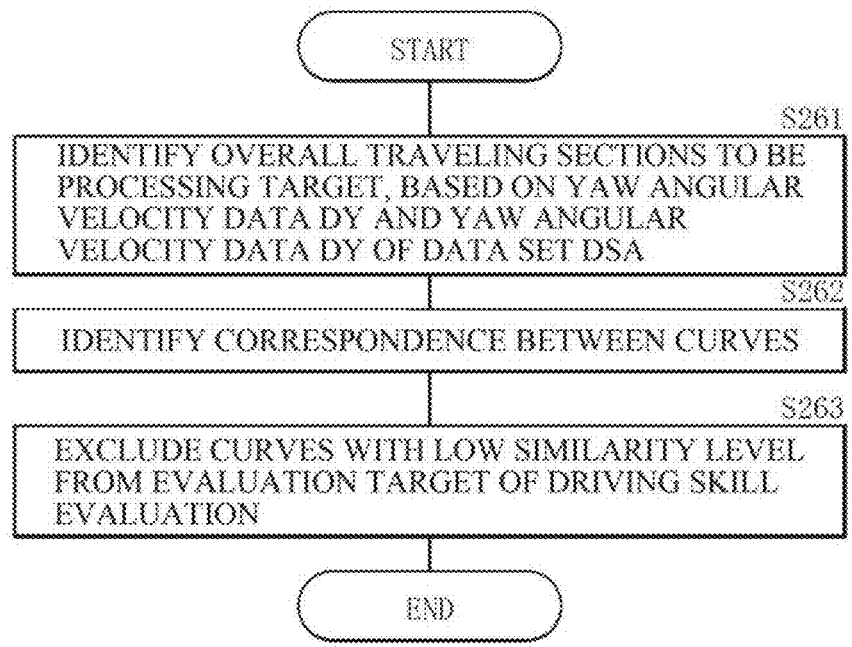
[ FIG. 17 ]
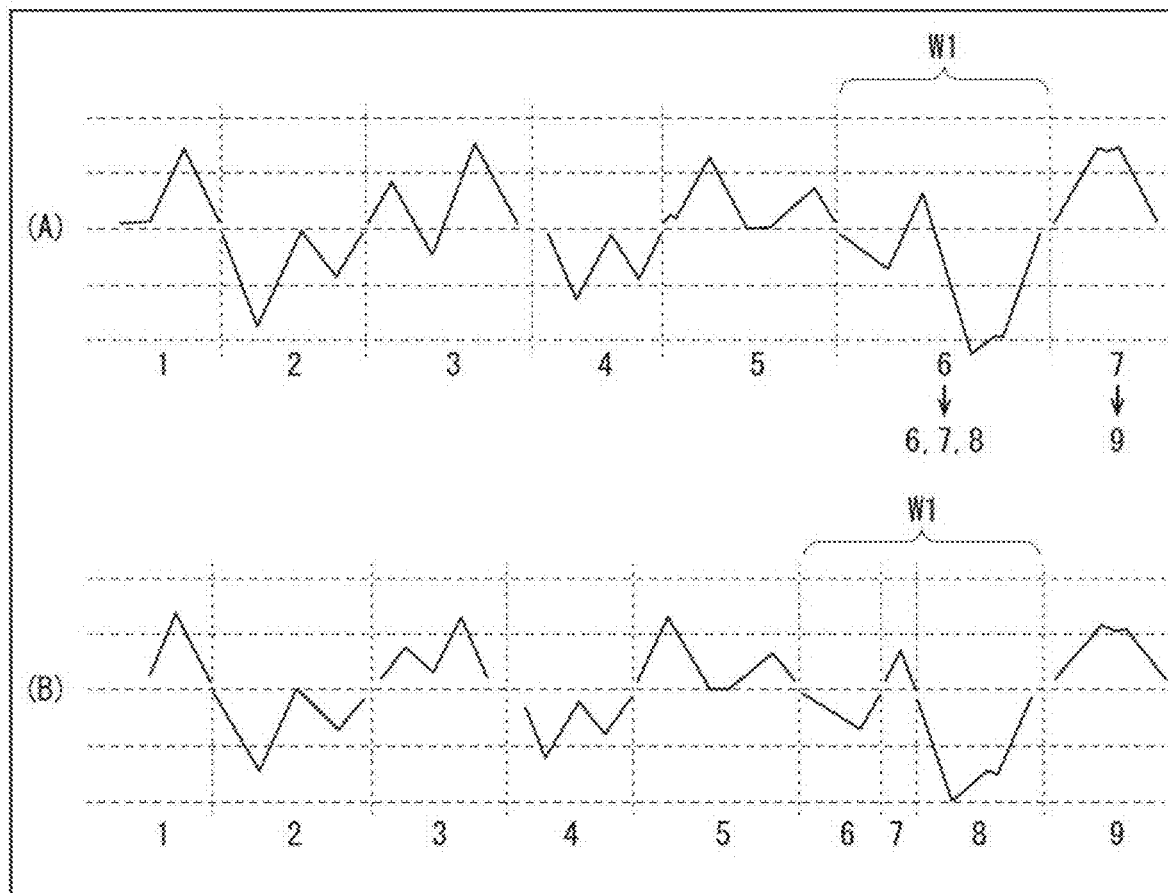

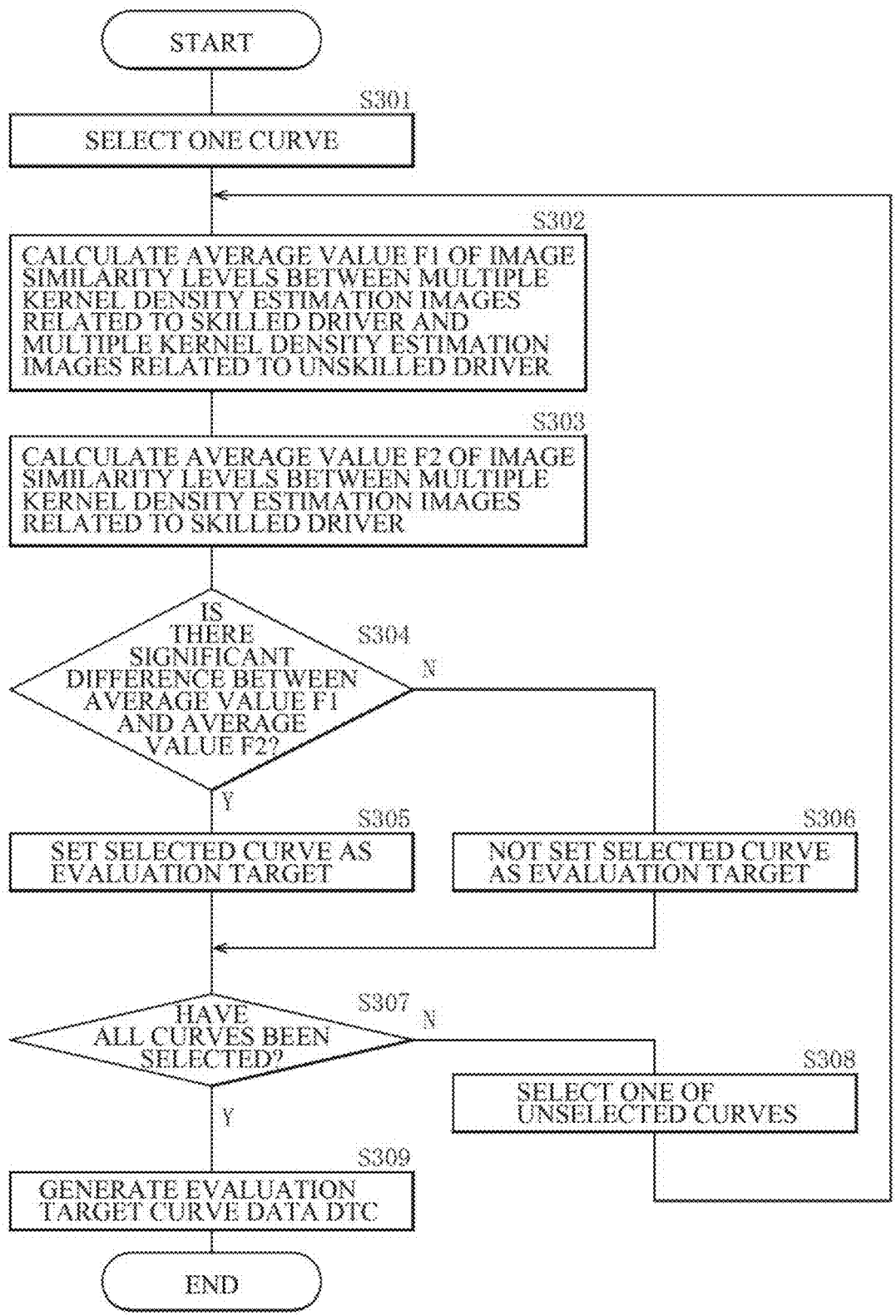
[FIG. 18]

[ FIG. 19A ]
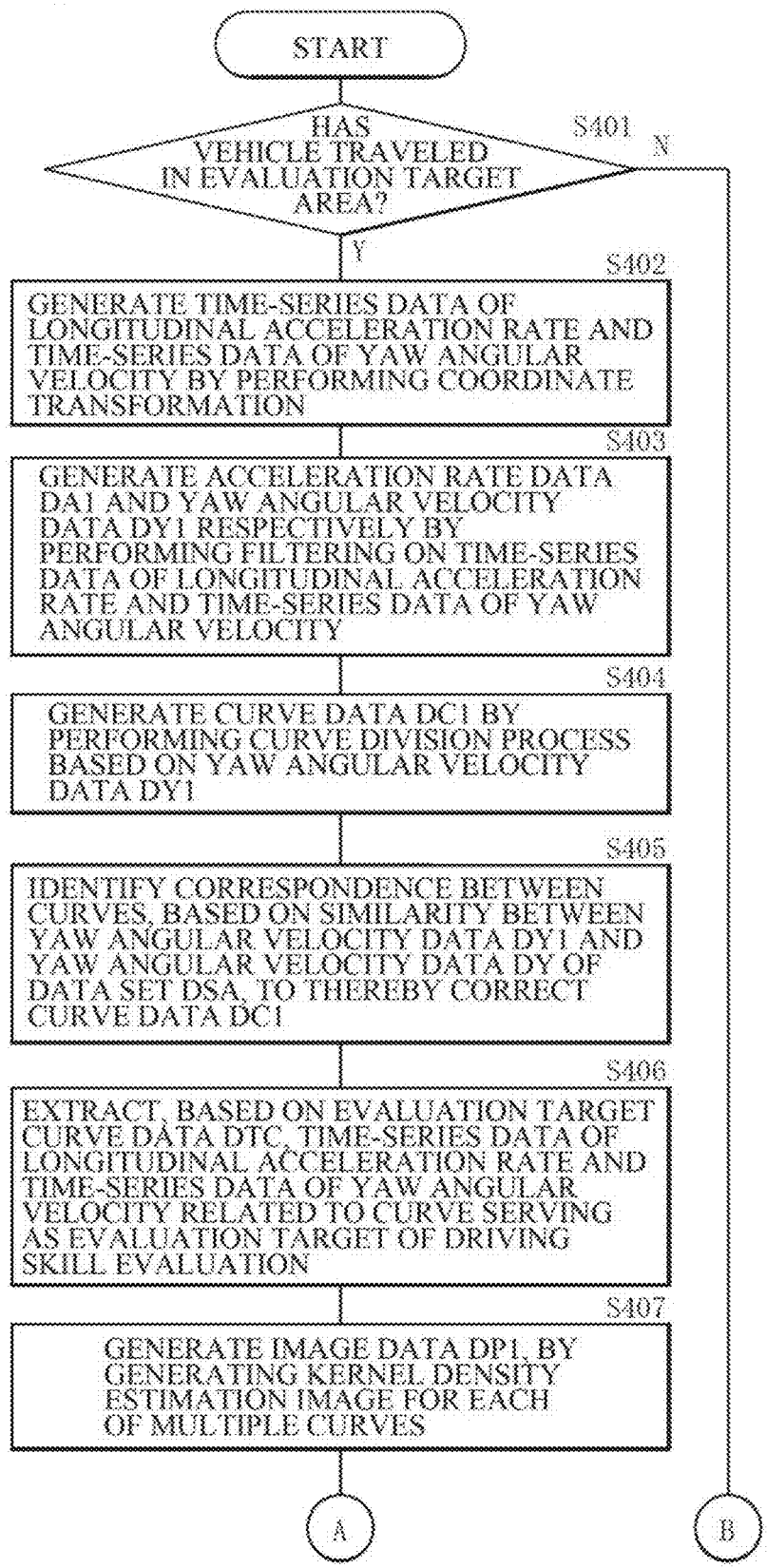

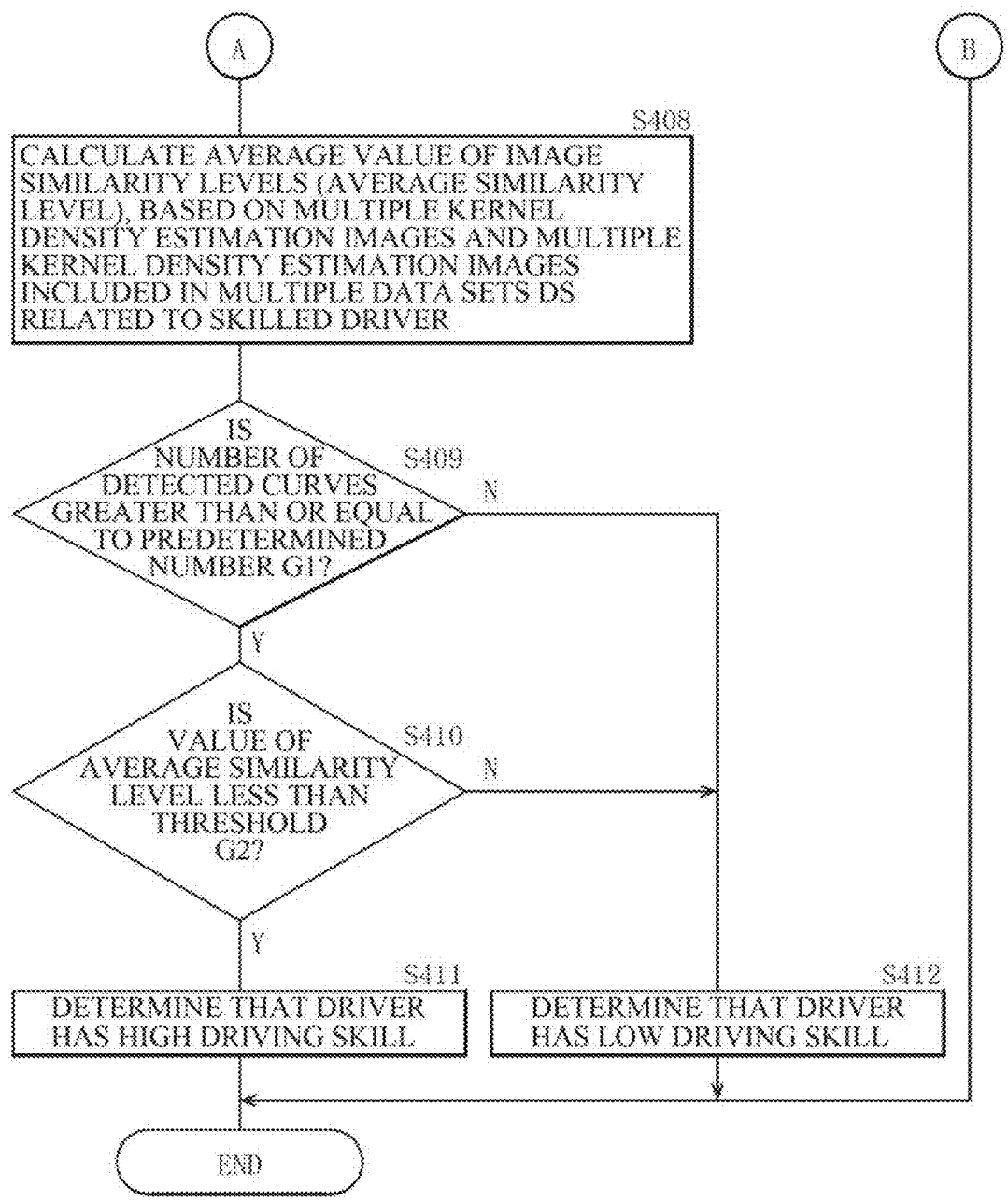

[FIG. 20]
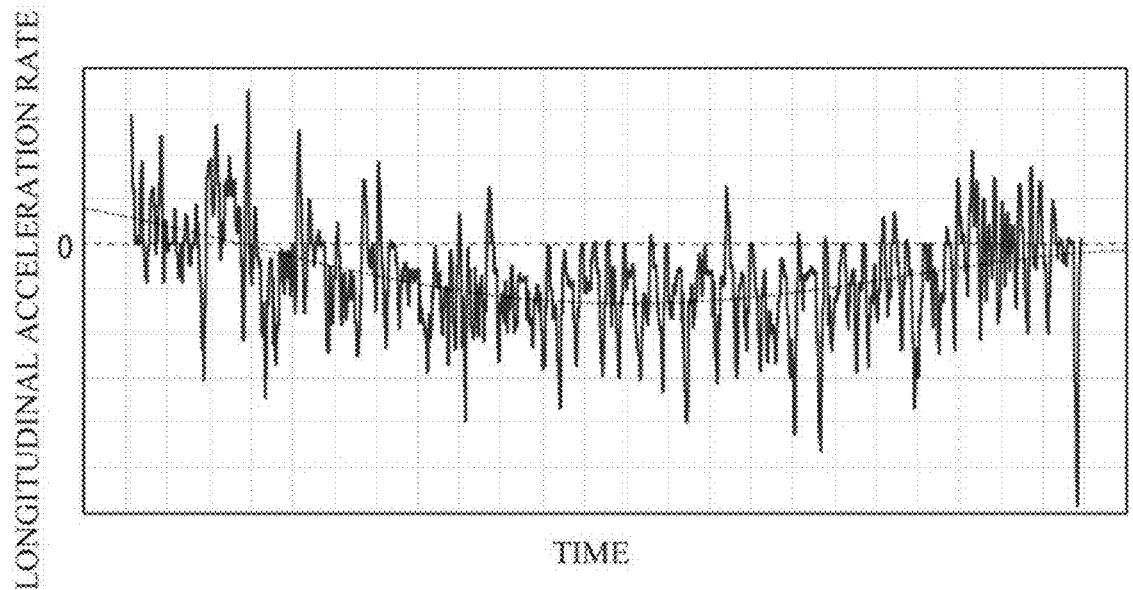
[FIG. 21]
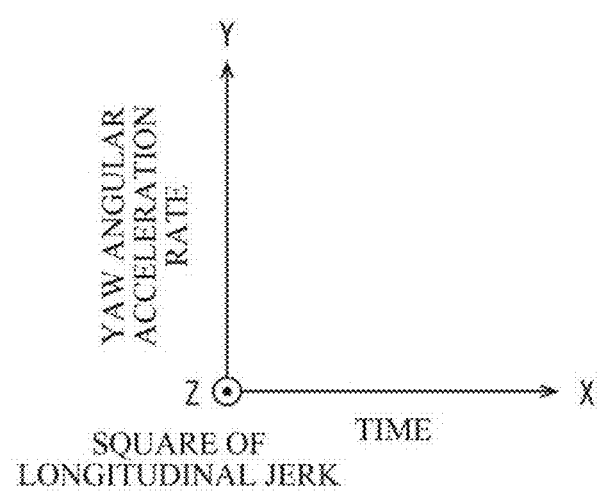

[FIG. 22]
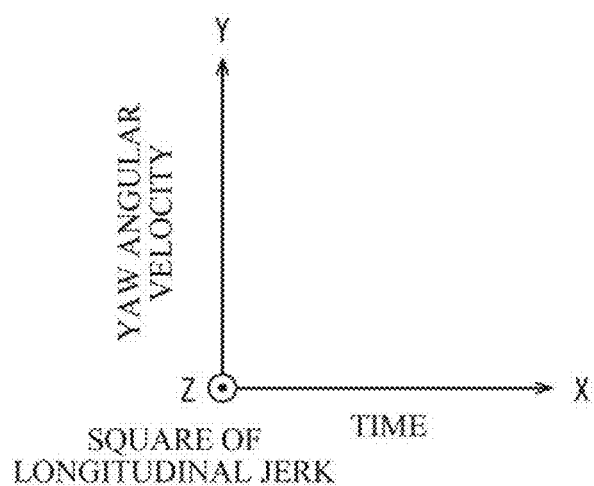
[FIG. 23]
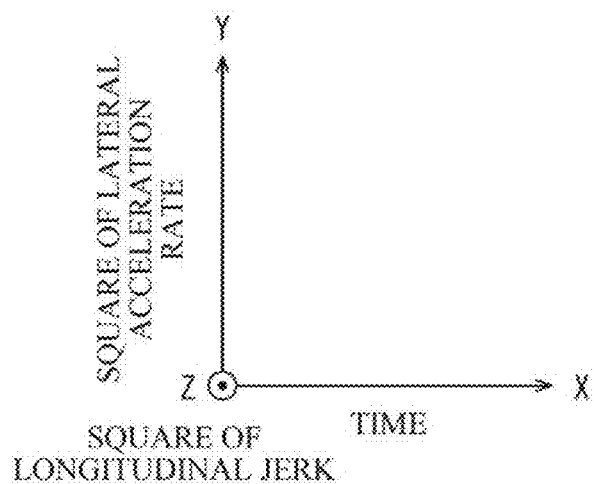
[FIG. 24]
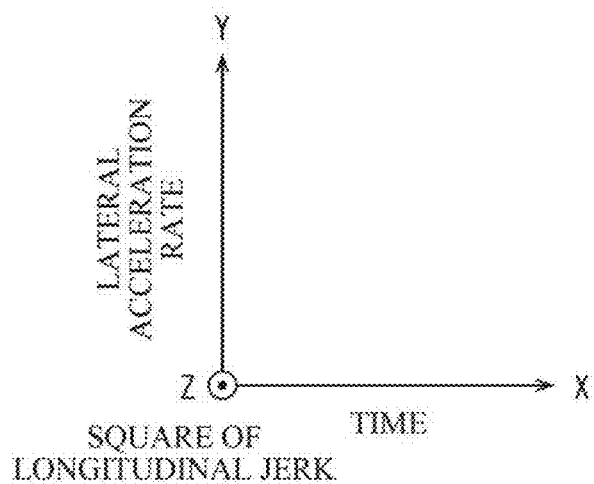

[ FIG. 25 ]
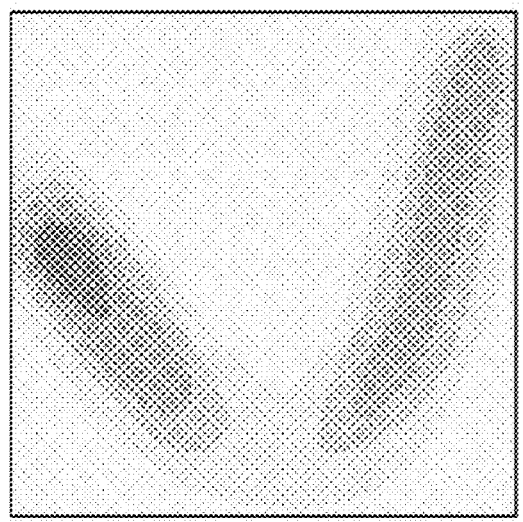
[ FIG. 26 ]
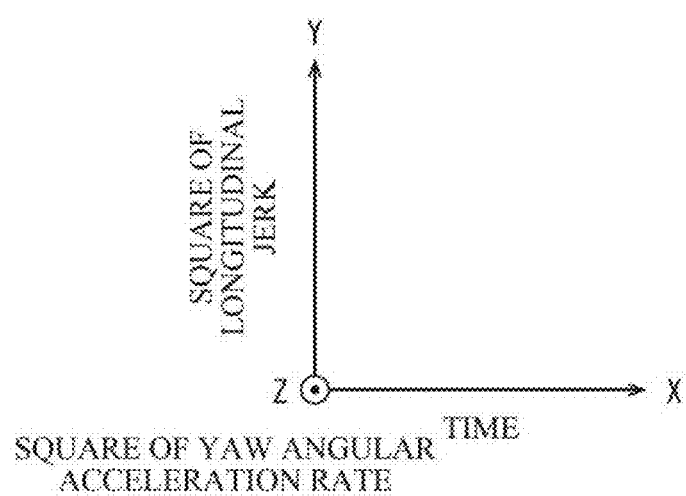

[ FIG. 27 ]
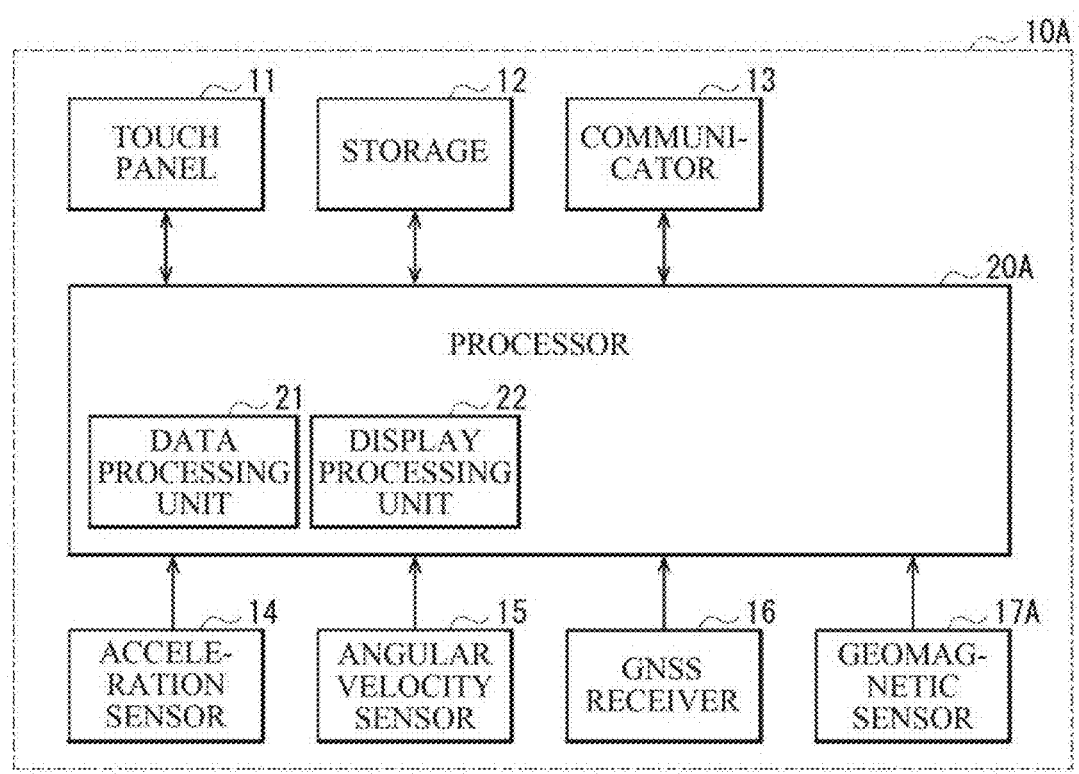

DRIVING SKILL EVALUATION METHOD, DRIVING SKILL EVALUATION SYSTEM, AND NON-TRANSITORY RECORDING MEDIUM

CROSS-REFERENCE TO RELATED APPLICATIONS

This application is the U.S. National Phase under 35 U.S.C. § 371 of International Application No. PCT/JP2022/040769, filed on Oct. 31, 2022.

TECHNICAL FIELD

The disclosure relates to a driving skill evaluation method and a driving skill evaluation system that evaluate a driving skill of a driver, and to a recording medium containing software that evaluates a driving skill of a driver.

BACKGROUND ART

In recent years, techniques of evaluating a driving skill of a driver have been developed for vehicles such as automobiles. For example, Patent Literature 1 discloses a technique of evaluating a driving skill of a driver, based on a longitudinal acceleration rate and a lateral acceleration rate obtained when a vehicle makes a turn.

CITATION LIST

Patent Literature

Patent Literature 1: Japanese Unexamined Patent Application Publication No. 2020-019289

SUMMARY OF INVENTION

A driving skill evaluation method according to one embodiment of the disclosure includes: generating a kernel density estimation image, based on time-series data of a first parameter corresponding to a direction change in a traveling direction of a vehicle, and time-series data of a second parameter indicating a square of a jerk in the traveling direction of the vehicle; and evaluating a driving skill of a driver of the vehicle, by comparing the kernel density estimation image with a reference image.

A driving skill evaluation system according to one embodiment of the disclosure includes an image generation circuit and an evaluation circuit. The image generation circuit is configured to generate a kernel density estimation image, based on time-series data of a first parameter corresponding to a direction change in a traveling direction of a vehicle, and time-series data of a second parameter indicating a square of a jerk in the traveling direction of the vehicle. The evaluation circuit is configured to evaluate a driving skill of a driver of the vehicle, by comparing the kernel density estimation image with a reference image.

A non-transitory recording medium according to one embodiment of the disclosure contains software. The software causes a processor to: generate a kernel density estimation image, based on time-series data of a first parameter corresponding to a direction change in a traveling direction of a vehicle, and time-series data of a second parameter indicating a square of a jerk in the traveling direction of the vehicle; and evaluate a driving skill of a driver of the vehicle, by comparing the kernel density estimation image with a reference image.

BRIEF DESCRIPTION OF DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is an explanatory diagram illustrating a configuration example of a driving technique evaluation system to which a driving skill evaluation method according to one embodiment of the disclosure is applied.

FIG. 2 is a block diagram illustrating a configuration example of a smartphone illustrated in FIG. 1.

FIG. 3 is a block diagram illustrating a configuration example of a server apparatus 30 illustrated in FIG. 1.

FIG. 4 is an explanatory diagram illustrating data that is stored in a storage 32 illustrated in FIG. 3.

FIG. 5 is an explanatory diagram illustrating an example of yaw angular velocity data and curve data illustrated in FIG. 4.

FIG. 6 is an image diagram illustrating an example of a kernel density estimation image indicated by image data illustrated in FIG. 4.

FIG. 7 is an explanatory diagram illustrating an example of parameters in the kernel density estimation image illustrated in FIG. 6.

FIG. 8 is an explanatory diagram illustrating a configuration example of a data processing system illustrated in FIG. 1.

FIG. 9 is a block diagram illustrating a configuration example of an in-vehicle apparatus illustrated in FIG. 8.

FIG. 10 is a block diagram illustrating a configuration example of an information processing apparatus illustrated in FIG. 8.

FIG. 11 is a flowchart illustrating an operation example of the information processing apparatus illustrated in FIG. 8.

FIG. 12 is another flowchart illustrating the operation example of the information processing apparatus illustrated in FIG. 8.

FIG. 13 is another flowchart illustrating the operation example of the information processing apparatus illustrated in FIG. 8.

FIG. 14 is another flowchart illustrating the operation example of the information processing apparatus illustrated in FIG. 8.

FIG. 15 is an explanatory diagram illustrating an example of a process of generating a preprocessed image illustrated in FIG. 14.

FIG. 16 is another flowchart illustrating the operation example of the information processing apparatus illustrated in FIG. 8.

FIG. 17 is an explanatory diagram illustrating the operation example of the information processing apparatus illustrated in FIG. 8.

FIG. 18 is another flowchart illustrating the operation example of the information processing apparatus illustrated in FIG. 8.

FIG. 19A is a flowchart illustrating an operation example of the server apparatus illustrated in FIG. 1.

FIG. 19B is another flowchart illustrating the operation example of the server apparatus illustrated in FIG. 1.

FIG. 20 is an explanatory diagram illustrating an example of time-series data of a longitudinal acceleration rate.

FIG. 21 is an explanatory diagram illustrating an example of parameters in a kernel density estimation image according to a modification example.

FIG. 22 is an explanatory diagram illustrating an example of parameters in a kernel density estimation image according to another modification example.

FIG. 23 is an explanatory diagram illustrating an example of parameters in a kernel density estimation image according to another modification example.

FIG. 24 is an explanatory diagram illustrating an example of parameters in a kernel density estimation image according to another modification example.

FIG. 25 is an image diagram illustrating an example of a kernel density estimation image according to another modification example.

FIG. 26 is an explanatory diagram illustrating an example of parameters in the kernel density estimation image illustrated in FIG. 25.

FIG. 27 is a block diagram illustrating a configuration example of a smartphone according to another modification example.

MODES FOR CARRYING OUT THE INVENTION

Evaluation accuracy is desirably high in evaluating a driving skill of a driver, and a further improvement in the evaluation accuracy is expected.

It is desirable to provide a driving skill evaluation method, a driving skill evaluation system, and a recording medium that make it possible to enhance evaluation accuracy of a driving skill of a driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Embodiment

Configuration Example

FIG. 1 illustrates a configuration example of a driving skill evaluation system 1 to which a driving skill evaluation method according to one embodiment is applied. The driving skill evaluation system 1 includes a smartphone 10, a server apparatus 30, and a data processing system 2.

The smartphone 10 is an advanced mobile phone. The smartphone 10 is fixedly installed in a vehicle of a vehicle 9, in a predetermined orientation with respect to the vehicle 9. The smartphone 10 collects traveling data of the vehicle 9. The smartphone 10 is coupled to the unillustrated Internet by communicating with an unillustrated mobile phone base station via, for example, mobile phone communication.

The server apparatus 30 is an information processing apparatus. The server apparatus 30 evaluates a driving skill of a driver of the vehicle 9, based on the traveling data of the vehicle 9. The server apparatus 30 is coupled to the unillustrated Internet. The server apparatus 30 is able to communicate with the smartphone 10 via the Internet.

The data processing system 2 includes an information processing apparatus, and generates data to be used in evaluating the driving skill. The data processing system 2 is coupled to the unillustrated Internet. The data processing system 2 is able to communicate with the server apparatus 30 via the Internet.

In the driving skill evaluation system 1, the driver serving as an evaluation target drives the vehicle 9 in an evaluation target area with many curves, including, for example, a mountain road or the like. The smartphone 10 thus collects the traveling data of the vehicle 9, and transmits the traveling data to the server apparatus 30. The traveling data includes information regarding an acceleration rate (a longitudinal acceleration rate) in a traveling direction of the vehicle 9, information regarding a yaw angular velocity of the vehicle 9, and information regarding a position of the vehicle 9. The server apparatus 30 detects multiple curves in a traveling course traveled by the vehicle 9, based on time-series data of the yaw angular velocity of the vehicle 9. The server apparatus 30 generates a kernel density estimation image at each of the multiple curves, based on time-series data of the longitudinal acceleration rate and the time-series data of the yaw angular velocity. For each of the multiple curves, the server apparatus 30 compares the kernel density estimation image generated by the server apparatus 30 with a kernel density estimation image related to a skilled driver, generated by the data processing system 2, and registered in the server apparatus 30 in advance, to thereby evaluate the driving skill of the driver. The smartphone 10 presents an evaluation result of the driving skill to the driver. Thus, in the driving skill evaluation system 1, it is possible for the driver to obtain an objective evaluation about the own driving skill.

FIG. 2 illustrates a configuration example of the smartphone 10. The smartphone 10 includes a touch panel 11, a storage 12, a communicator 13, an acceleration sensor 14, an angular velocity sensor 15, a global navigation satellite system (GNSS) receiver 16, and a processor 20.

The touch panel 11 is a user interface. The touch panel 11 includes, for example, a touch sensor, and a display such as a liquid crystal display or an organic electroluminescence (EL) display. The touch panel 11 accepts an operation by a user of the smartphone 10, and displays a processing result of the smartphone 10.

The storage 12 is a nonvolatile memory. The storage 12 is configured to hold, for example, program data of various pieces of application software. In this example, the smartphone 10 is installed with application software related to the driving skill evaluation system 1. The program data of the application software is stored in the storage 12.

The communicator 13 is configured to communicate with the mobile phone base station by performing mobile phone communication. Thus, the communicator 13 communicates with the server apparatus 30 coupled to the Internet, via the mobile phone base station.

The acceleration sensor 14 is configured to detect each of acceleration rates in three directions in a coordinate system of the smartphone 10.

The angular velocity sensor 15 is configured to detect each of three angular velocities (the yaw angular velocity, a roll angular velocity, and a pitch angular velocity) in the coordinate system of the smartphone 10.

The GNSS receiver 16 is configured to acquire a position of the vehicle 9 on the ground, by using a GNSS such as a global positioning system (GPS).

The processor 20 is configured to control operation of the smartphone 10. The processor 20 includes, for example, one or more processors, one or more memories, and the like. The processor 20 collects time-series data of the acceleration rate detected by the acceleration sensor 14, time-series data of the angular velocity detected by the angular velocity sensor 15, and time-series data of the position of the vehicle 9 obtained by the GNSS receiver 16. The processor 20 may execute the application software related to the driving skill evaluation system 1 and installed on the smartphone 10, to thereby operate as a data processing unit 21 and a display processing unit 22.

The data processing unit 21 is configured to perform predetermined data processing, based on a detection result of the acceleration sensor 14 and a detection result of the angular velocity sensor 15. The predetermined data processing includes, for example, filtering on the time-series data of the acceleration rate detected by the acceleration sensor 14, filtering on the time-series data of the angular velocity detected by the angular velocity sensor 15, and the like. Here, filtering is processing using a low-pass filter. After the end of traveling, the communicator 13 transmits the time-series data of the acceleration rate and the time-series data of the angular velocity processed by the data processing unit 21, to the server apparatus 30, together with the time-series data of the position of the vehicle 9 obtained by the GNSS receiver 16.

The display processing unit 22 is configured to perform display processing, based on data indicating the evaluation result of the driving skill and transmitted from the server apparatus 30. Thus, the touch panel 11 displays the evaluation result of the driving skill.

FIG. 3 illustrates a configuration example of the server apparatus 30. The server apparatus 30 includes a communicator 31, a storage 32, and a processor 40.

The communicator 31 is configured to communicate with the smartphone 10 via the Internet, by performing network communication.

The storage 32 includes, for example, a hard disk drive (HDD), a solid state drive (SSD), or the like. The storage 32 is configured to hold, for example, program data of various pieces of software. In this example, the server apparatus 30 is installed with server software related to the driving skill evaluation system 1. The program data of the software is stored in the storage 32. In addition, various pieces of data to be used by the software are stored in the storage 32.

FIG. 4 illustrates an example of the data stored in the storage 32 to be used by the server software. Area data DAR, multiple data sets DS (a data set DSA and multiple data sets DSB), and evaluation target curve data DTC are stored in the storage 32. These pieces of data are generated by the data processing system 2, and stored in the storage 32.

The area data DAR is data indicating the evaluation target area where the driving skill is to be evaluated. As the evaluation target area, for example, an area with many curves, such as an area including a mountain road, may be set. The area data DAR includes, for example, data regarding a latitude and a longitude of the evaluation target area.

Each of the multiple data sets DS is data corresponding to traveling data obtained by the skilled driver driving a vehicle in the area indicated by the area data DAR. The multiple data sets DS may include data corresponding to multiple pieces of traveling data related to skilled drivers different from each other, or data corresponding to multiple pieces of traveling data related to one skilled driver. Each of the multiple data sets DS includes acceleration rate data DA, yaw angular velocity data DY, curve data DC, and multiple pieces of image data DP.

The acceleration rate data DA is time-series data of an acceleration rate (a longitudinal acceleration rate) in a traveling direction of the vehicle driven by the skilled driver.

The yaw angular velocity data DY is time-series data of a yaw angular velocity of the vehicle driven by the skilled driver.

The curve data DC is data including curve numbers of multiple curves in a traveling course. The curve data DC is generated based on the yaw angular velocity data DY. In the curve data DC, the curve numbers of the multiple curves are set in association with the time-series data of the yaw angular velocity in the yaw angular velocity data DY.

FIG. 5 illustrates an example of the yaw angular velocity data DY and the curve data DC. The yaw angular velocity changes in accordance with the curves of the traveling course. The curve data DC includes curve numbers ("1" to "9" in FIG. 5) set based on the time-series data of the yaw angular velocity. In the curve data DC, the curve numbers of the multiple curves are set in association with the time-series data of the yaw angular velocity in the yaw angular velocity data DY.

The multiple pieces of image data DP is image data of kernel density estimation images at the multiple curves.

FIG. 6 illustrates an example of the kernel density estimation image at a given curve. FIG. 7 illustrates coordinate axes of the kernel density estimation image illustrated in FIG. 6. The kernel density estimation image has a horizontal axis (X-axis) representing time, and a vertical axis (Y-axis) representing a square of a yaw angular acceleration rate. The yaw angular acceleration rate is a time derivative of the yaw angular velocity. The kernel density estimation image has a pixel value (Z-axis) representing a square of a longitudinal jerk. The longitudinal jerk is a time derivative of the longitudinal acceleration rate. In the kernel density estimation image, a dark-colored image portion indicates a large value of the square of the longitudinal jerk, and a light-colored image portion indicates a small value of the square of the longitudinal jerk. In this example, the pixel value is smaller for a larger value of the square of the longitudinal jerk, and the pixel value is larger for a smaller value of the square of the longitudinal jerk. The kernel density estimation image can change in accordance with the driving skill of the driver. In the storage 32, multiple kernel density estimation images corresponding to the multiple curves are stored as the respective multiple pieces of image data DP.

As described above, each of the data set DSA and the multiple data sets DSB includes the acceleration rate data DA, the yaw angular velocity data DY, the curve data DC, and the multiple pieces of image data DP. As will be described later, the data processing system 2 adjusts the curve number of the curve data DC in each of the multiple data sets DSB, based on the curve data DC in the data set DSA. That is, because the curve number is generated based on the yaw angular velocity data DY, curve numbers different from each other can be assigned to a given curve, in accordance with the yaw angular velocity data DY. Accordingly, the data processing system 2 uses the data set DSA as sample data, and adjusts the curve number of the curve data DC in each of the multiple data sets DSB, based on the curve data DC in the data set DSA. Thus, in the curve data DC of the multiple data sets DSB, the curve numbers of the same curves as each other are adjusted to be the same as each other.

The evaluation target curve data DTC is data indicating curve numbers of multiple curves serving as an evaluation target of driving skill evaluation, of the multiple curves in the area indicated by the area data DAR.

Such data is stored in the storage 32. Note that described above is an example in which data regarding one area is stored in the storage 32, but this is non-limiting. Data regarding multiple areas may be stored. In this case, in the storage 32, the multiple data sets DS, the evaluation target curve data DTC, and the area data DAR are stored for each of the multiple areas.

The processor 40 (FIG. 3) is configured to control operation of the server apparatus 30. The processor 40 includes, for example, one or more processors, one or more memories, and the like. The processor 40 may execute the server software related to the driving skill evaluation system 1 and installed on the server apparatus 30, to thereby operate as a data processing unit 41, a curve detection unit 42, a data extraction unit 43, an image generation unit 44, an image similarity level calculation unit 45, and a skill determination unit 46.

The data processing unit 41 is configured to generate acceleration rate data DA1 and yaw angular velocity data DY1 by performing predetermined data processing, based on the time-series data of the acceleration rate, the time-series data of the angular velocity, and the time-series data of the position of the vehicle 9, received by the communicator 31. The predetermined data processing includes, for example: a process of checking whether the vehicle 9 has traveled in the evaluation target area, based on the time-series data of the position of the vehicle 9; a process of generating the time-series data of the acceleration rate (the longitudinal acceleration rate) in the traveling direction of the vehicle 9, by performing coordinate transformation based on the time-series data of the acceleration rate obtained by the smartphone 10; a process of generating the time-series data of the yaw angular velocity of the vehicle 9, by performing coordinate transformation based on the time-series data of the angular velocity obtained by the smartphone 10; filtering on the time-series data of the longitudinal acceleration rate; filtering on the time-series data of the yaw angular velocity; and the like. Here, filtering is processing using a low-pass filter.

The curve detection unit 42 is configured to generate curve data DC1 by detecting multiple curves based on the yaw angular velocity data DY1 generated by the data processing unit 41.

The data extraction unit 43 is configured to, based on the evaluation target curve data DTC stored in the storage 32, extract the time-series data of the longitudinal acceleration rate related to the multiple curves serving as the evaluation target of driving skill evaluation, of the time-series data of the longitudinal acceleration rate included in the acceleration rate data DA1, and extract the time-series data of the yaw angular velocity related to the multiple curves serving as the evaluation target of driving skill evaluation, of the time-series data of the yaw angular velocity included in the yaw angular velocity data DY1.

The image generation unit 44 is configured to generate multiple pieces of image data DP1, by generating respective multiple kernel density estimation images related to the multiple curves, based on the time-series data of the longitudinal acceleration rate and the time-series data of the yaw angular velocity related to the multiple curves, extracted by the data extraction unit 43. Specifically, the image generation unit 44 performs a kernel density estimation process, based on the time-series data of the longitudinal acceleration rate and the time-series data of the yaw angular velocity related to one curve, to thereby generate the kernel density estimation image at the curve. In the kernel density estimation process, based on actual data, intrinsic data including data not observed yet is estimated as density data. The image generation unit 44 generates the multiple kernel density estimation images by performing this process for each of the multiple curves. In this manner, the image generation unit 44 generates the multiple pieces of image data DP1 related to the multiple curves.

The image similarity level calculation unit 45 is configured to calculate an average value of image similarity levels (an average similarity level), based on the multiple kernel density estimation images generated by the image generation unit 44, and the multiple kernel density estimation images included in the multiple data sets DS stored in the storage 32. Specifically, the image similarity level calculation unit 45 calculates each image similarity level by comparing, for one curve, the kernel density estimation image generated by the image generation unit 44 with the multiple kernel density estimation images included in the multiple data sets DS. The image similarity level calculation unit 45 calculates multiple image similarity levels by performing this process for each of the multiple curves. The image similarity level calculation unit 45 calculates the average value of these multiple image similarity levels (the average similarity level).

The skill determination unit 46 is configured to determine the driving skill of the driver of the vehicle 9, based on the average similarity level calculated by the image similarity level calculation unit 45. The communicator 31 transmits data indicating the evaluation result of the driving skill generated by the skill determination unit 46 to the smartphone 10.

The multiple data sets DS, the evaluation target curve data DTC, and the area data DAR stored in the storage 32 are generated by the data processing system 2. In the following, description is given of the data processing system 2.

FIG. 8 illustrates a configuration example of the data processing system 2. The data processing system 2 includes an in-vehicle apparatus 110 and an information processing apparatus 130. The in-vehicle apparatus 110 is an apparatus mounted on a vehicle 109 driven by the skilled driver. In this example, the information processing apparatus 130 is what is called a personal computer.

FIG. 9 illustrates a configuration example of the in-vehicle apparatus 110. The in-vehicle apparatus 110 includes an acceleration sensor 114, a yaw angular velocity sensor 115, a GNSS receiver 116, and a processor 120.

The acceleration sensor 114 is configured to detect the acceleration rate (the longitudinal acceleration rate) in the traveling direction of the vehicle 109.

The yaw angular velocity sensor 115 is configured to detect the yaw angular velocity of the vehicle 109.

The GNSS receiver 116 is configured to acquire a position of the vehicle 109 on the ground, by using a GNSS such as a GPS.

The processor 120 is what is called an electronic control unit (ECU), and includes, for example, one or more processors, one or more memories, and the like. The processor 120 collects time-series data of the longitudinal acceleration rate detected by the acceleration sensor 114, time-series data of the yaw angular velocity detected by the yaw angular velocity sensor 115, and time-series data of the position of the vehicle 109 obtained by the GNSS receiver 116.

For example, after the end of traveling, an engineer stores these pieces of time-series data collected by the processor 120 in, for example, an external recording medium such as a semiconductor memory.

FIG. 10 illustrates a configuration example of the information processing apparatus 130. The information processing apparatus 130 reads data stored in the external recording medium, based on the engineer's operation, and generates, based on the read data, the multiple data sets DS, the evaluation target curve data DTC, and the area data DAR to be stored in the storage 32 of the server apparatus 30. The information processing apparatus 130 includes a user interface 131, a storage 132, a communicator 133, and a processor 140.

The user interface 131 includes, for example, a keyboard, a mouse, and a display such as a liquid crystal display or an organic EL display. The user interface 131 accepts an operation by a user of the information processing apparatus 130 (the engineer in this example), and displays a processing result of the information processing apparatus 130.

The storage 132 includes, for example, a HDD, a SSD, or the like. The storage 132 is configured to hold, for example, program data of various pieces of software. In this example, the information processing apparatus 130 is installed with software related to the data processing system 2. The program data of the software is stored in the storage 132.

The communicator 133 is configured to communicate with the server apparatus 30 via the Internet, by performing network communication.

The processor 140 is configured to control operation of the information processing apparatus 130. The processor 140 includes, for example, one or more processors, one or more memories, and the like. The processor 140 may execute the software related to the data processing system 2 and installed on the information processing apparatus 130, to thereby operate as a data processing unit 141, a curve detection unit 142, an image generation unit 144, an image similarity level calculation unit 145, an evaluation target data generation unit 147, an area data generation unit 148, and a data registration unit 149.

The data processing unit 141 is configured to generate the acceleration rate data DA and the yaw angular velocity data DY by performing predetermined data processing, based on the time-series data of the longitudinal acceleration rate and the time-series data of the yaw angular velocity, read from the external recording medium. The predetermined data processing includes, for example, filtering on the time-series data of the longitudinal acceleration rate, filtering on the time-series data of the yaw angular velocity, a process of generating the area data DAR based on the engineer's operation, and the like. Here, filtering is processing using a low-pass filter.

The curve detection unit 142 is configured to generate the curve data DC by detecting multiple curves based on the yaw angular velocity data DY generated by the data processing unit 141. The process by the curve detection unit 142 is similar to the process by the curve detection unit 42 in the server apparatus 30.

The image generation unit 144 is configured to generate the multiple pieces of image data DP, by generating respective multiple kernel density estimation images related to the multiple curves, based on the time-series data of the longitudinal acceleration rate and the time-series data of the yaw angular velocity related to the multiple curves. The process by the image generation unit 144 is similar to the process by the image generation unit 44 in the server apparatus 30.

The image similarity level calculation unit 145 is configured to calculate the image similarity level, based on the multiple kernel density estimation images. The process of calculating the image similarity level in the image similarity level calculation unit 145 is similar to the process of calculating the image similarity level in the image similarity level calculation unit 45 of the server apparatus 30.

The evaluation target data generation unit 147 is configured to generate the evaluation target curve data DTC, by deciding multiple curves serving as the evaluation target of the driving skill, based on a processing result of the image similarity level calculation unit 145.

The area data generation unit 148 is configured to generate, based on the engineer's operation, the area data DAR that is data indicating the evaluation target area.

The data registration unit 149 is configured to store, in the storage 132: the data set DS including the acceleration rate data DA, the yaw angular velocity data DY, the curve data DC, and the multiple pieces of image data DP; the evaluation target curve data DTC; and the area data DAR.

With this configuration, the data processing system 2 generates the multiple data sets DS, the evaluation target curve data DTC, and the area data DAR, based on the traveling data regarding the skilled driver. The data processing system 2 transmits the multiple data sets DS, the evaluation target curve data DTC, and the area data DAR to the server apparatus 30. The server apparatus 30 stores these pieces of data in the storage 32.

Here, the image generation unit 44 corresponds to a specific example of an "image generation circuit" in the disclosure. The image similarity level calculation unit 45 and the skill determination unit 46 correspond to a specific example of an "evaluation circuit" in the disclosure. The square of the yaw angular acceleration rate corresponds to a specific example of a "first parameter" in the disclosure. The square of the longitudinal jerk corresponds to a specific example of a "second parameter" in the disclosure. The kernel density estimation image indicated by the image data DP of the data set DS stored in the storage 32 corresponds to a specific example of a "reference image" in the disclosure.

Operations and Workings

Next, description is given of operations and workings of the driving skill evaluation system 1 according to the present embodiment.

Outline of Overall Operation

Operation of the driving skill evaluation system 1 is described with reference to FIGS. 1 to 4 and 8 to 10.

First, the driving skill evaluation system 1 generates the multiple data sets DS, the evaluation target curve data DTC, and the area data DAR, based on the traveling data obtained when the skilled driver drives the vehicle 109.

Specifically, the processor 120 of the in-vehicle apparatus 110 collects the traveling data of the vehicle 109, by the skilled driver driving the vehicle 109 of the data processing system 2. For example, after the end of traveling, the engineer stores the traveling data collected by the processor 120 in, for example, the external recording medium such as a semiconductor memory. The information processing apparatus 130 generates the acceleration rate data DA, the yaw angular velocity data DY, the curve data DC, and the multiple pieces of image data DP, based on the traveling data, and stores the data set DS including these pieces of data in the storage 132. By repeating this process, the information processing apparatus 130 stores the multiple data sets DS in the storage 132. In addition, the information processing apparatus 130 generates, based on the multiple data sets DS, the evaluation target curve data DTC that is data indicating the multiple curves serving as the evaluation target of the driving skill. The information processing apparatus 130 also generates, based on the engineer's operation, the area data DAR that is data indicating the evaluation target area. The information processing apparatus 130 stores these pieces of data in the storage 132. The information processing apparatus 130 transmits the multiple data sets DS, the evaluation target curve data DTC, and the area data DAR to the server apparatus 30. The server apparatus 30 stores, in the storage 32, the multiple data sets DS, the evaluation target curve data DTC, and the area data DAR transmitted from the information processing apparatus 130.

The driving skill evaluation system 1 evaluates the driving skill of the driver, by using the multiple data sets DS, the evaluation target curve data DTC, and the area data DAR generated in this manner by the skilled driver driving the vehicle 109.

Specifically, the smartphone 10 collects the traveling data of the vehicle 9, by the driver serving as the evaluation target driving the vehicle 9. The smartphone 10 transmits the collected traveling data to the server apparatus 30. The server apparatus 30 generates the acceleration rate data DA1, the yaw angular velocity data DY1, the curve data DC1, and the multiple pieces of image data DP1, based on the traveling data. The server apparatus 30 calculates the average value of the image similarity levels (the average similarity level), based on the multiple kernel density estimation images indicated by the multiple pieces of image data DP1, and the multiple kernel density estimation images indicated by the multiple pieces of image data DP included in the multiple data sets DS stored in the storage 32. Based on the average similarity level, the server apparatus 30 determines the driving skill of the driver of the vehicle 9. The server apparatus 30 transmits data indicating the evaluation result of the driving skill to the smartphone 10. The smartphone 10 displays the determination result of the driving skill transmitted from the server apparatus 30.

Detailed Operation

In the following, detailed description is given of the operation of the driving skill evaluation system 1.
(Generation of Multiple Data Sets DS)

First, the data processing system 2 generates the multiple data sets DS, based on the traveling data obtained by the skilled driver driving the vehicle 109. The operation of generating the multiple data sets DS is described in detail below.

When the skilled driver drives the vehicle 109, in the vehicle 109, the acceleration sensor 114 of the in-vehicle apparatus 110 detects the acceleration rate (the longitudinal acceleration rate) in the traveling direction of the vehicle 109, the yaw angular velocity sensor 115 detects the yaw angular velocity of the vehicle 109, and the GNSS receiver 116 acquires the position of the vehicle 109 on the ground. The processor 120 collects the time-series data of the longitudinal acceleration rate detected by the acceleration sensor 114, the time-series data of the yaw angular velocity detected by the yaw angular velocity sensor 115, and the time-series data of the position of the vehicle 109 obtained by the GNSS receiver 116.

For example, after the end of traveling, the engineer stores these pieces of time-series data collected by the processor 120 in, for example, the external recording medium such as a semiconductor memory.

The information processing apparatus 130 generates the data set DS, based on the time-series data of the longitudinal acceleration rate, the time-series data of the yaw angular velocity, and the time-series data of the position of the vehicle 109, read from the external recording medium, and stores the data set DS in the storage 132. This operation of the information processing apparatus 130 is described in detail below.

FIG. 11 illustrates an operation example of the information processing apparatus 130 in the data processing system 2. In this example, the area data generation unit 148 has already generated the area data DAR, based on the engineer's operation.

First, the data processing unit 141 of the information processing apparatus 130 checks whether the vehicle 109 has traveled in the evaluation target area, by using the area data DAR stored in the storage 132, based on the time-series data of the position of the vehicle 109 (step S101). If the vehicle 109 has not traveled in the evaluation target area ("N" in step S101), this process ends.

If the vehicle 109 has traveled in the evaluation target area ("Y" in step S101), the data processing unit 141 generates the acceleration rate data DA and the yaw angular velocity data DY respectively by performing filtering on the time-series data of the longitudinal acceleration rate and the time-series data of the yaw angular velocity in the evaluation target area (step S102).

Thereafter, the curve detection unit 142 generates the curve data DC by performing a curve division process based on the yaw angular velocity data DY generated in step S102 (step S103). The curve division process includes two stages of processes described below.

FIG. 12 illustrates a specific example of a first-stage process in the curve division process. The curve detection unit 142 performs the process illustrated in FIG. 12, while sequentially reading the yaw angular velocity included in the yaw angular velocity data DY in a chronological order.

First, the curve detection unit 142 checks whether a yaw angular velocity greater than or equal to a predetermined value A (e.g., greater than or equal to 0.02 rad/sec.) is kept for a time longer than or equal to a predetermined time B (e.g., longer than or equal to 2 seconds) (step S201). This condition is a basic condition for curve detection by the curve detection unit 142. Note that the predetermined time B is used for evaluation in this example, but a predetermined distance may be used for evaluation instead of the predetermined time B. If this condition is not satisfied ("N" in step S201), the process in step S201 is repeated until this condition is satisfied.

If the condition described in step S201 is satisfied ("Y" in step S201), the curve detection unit 142 checks whether a polarity of the yaw angular velocity is the same as a polarity of the yaw angular velocity at an immediately preceding curve, and the vehicle 109 has traveled on a straight road for a time shorter than a predetermined time C (e.g., shorter than 9 seconds) after the immediately preceding curve (step S202). Note that the predetermined time C is used for evaluation in this example, but a predetermined distance may be used for evaluation instead of the predetermined time C.

If this condition is not satisfied in step S202 ("N" in step S202), the curve detection unit 142 detects a curve (step S203). That is, because the basic condition for curve detection is satisfied in step S201 and a distance from the immediately preceding curve is long, the curve detection unit 142 detects a new curve, separately from the immediately preceding curve. The curve detection unit 142 assigns a curve number to the detected curve. Thereafter, the process proceeds to step S205.

If this condition is satisfied in step S202 ("Y" in step S202), the curve detection unit 142 regards the immediately preceding curve as continuing (step S203). That is, because the basic condition for curve detection is satisfied in step S201 but the distance from the immediately preceding curve is short, the immediately preceding curve is regarded as continuing. Thereafter, the process proceeds to step S205.

Thereafter, the curve detection unit 142 checks whether the yaw angular velocity is less than or equal to the predetermined value A (e.g., less than or equal to 0.02 rad/sec.) (step S205). That is, the curve detection unit 142 checks whether the basic condition for curve detection is no longer satisfied. If the yaw angular velocity is not less than or equal to the predetermined value A ("N" in step S205), the process in step S205 is repeated until the yaw angular velocity becomes less than or equal to the predetermined value A.

If the yaw angular velocity is less than or equal to the predetermined value A ("Y" in step S205), the curve detection unit 142 checks whether the yaw angular velocity becomes greater than or equal to the predetermined value A (e.g., greater than or equal to 0.02 rad/sec.), after the yaw angular velocity less than the predetermined value A (e.g., less than 0.02 rad/sec.) is kept for a time shorter than the predetermined time B (e.g., shorter than 2 seconds) (step S206). If this condition is satisfied ("Y" in step S206), the curve detection unit 142 regards the immediately preceding curve as continuing (step S207). That is, when this condition is satisfied, the curve detection unit 142 determines that the vehicle 109 has wobbled by the driver adjusting a steering operation immediately after the end of the curve, and regards the immediately preceding curve as continuing. Thereafter, the process returns to step S205.

If the condition in step S206 is not satisfied ("N" in step S206), the curve detection unit 142 detects the end of the curve (step S208).

Thereafter, the curve detection unit 142 checks whether all pieces of data of the yaw angular velocity included in the yaw angular velocity data DY have been read (step S209). If all the pieces of data have not been read yet ("N" in step S209), the process returns to step S201.

If all the pieces of data have been read in step S209 ("Y" in step S209), this process ends.

As described above, in the first-stage process in the curve division process, the curve detection unit 142 basically detects a curve when a yaw angular velocity greater than or equal to the predetermined value A (e.g., greater than or equal to 0.02 rad/sec.) is kept for a time longer than or equal to the predetermined time B (e.g., longer than or equal to 2 seconds) (step S201). In addition, after the curve ends, when a yaw angular velocity less than the predetermined value A (e.g., less than 0.02 rad/sec.) is kept for a time shorter than the predetermined time B (e.g., shorter than 2 seconds), and the yaw angular velocity thereafter becomes greater than or equal to the predetermined value A (e.g., greater than or equal to 0.02 rad/sec.), the curve detection unit 142 regards the immediately preceding curve as continuing (steps S205 to S207). In addition, when the straight road between two curves curved in the same direction is short, the curve detection unit 142 regards these two curves as one curve (steps S201, S202, and S204).

FIG. 13 illustrates a specific example of a second-stage process in the curve division process. The curve detection unit 142 performs the second-stage process by using a result of the first-stage process. Thus, the curve detection unit 142 decides whether to use each of multiple curves detected by the first-stage process as the evaluation target of driving skill evaluation.

First, the curve detection unit 142 selects a first curve of the multiple curves obtained by the first-stage process (step S221).

Thereafter, the curve detection unit 142 checks whether an average value of the yaw angular velocities at the selected curve is less than a predetermined value D (e.g., less than 0.05 rad/sec.) (step S222).

If the average value of the yaw angular velocities is less than the predetermined value D in step S222 ("Y" in step S222), the curve detection unit 142 checks whether a maximum value of the yaw angular velocity is greater than or equal to a predetermined value E (e.g., greater than or equal to 0.07 rad/sec.) (step S223).

If the average value of the yaw angular velocities is not less than the predetermined value D in step S222 ("N" in step S222), or if the maximum value of the yaw angular velocity is greater than or equal to the predetermined value E in step S223 ("Y" in step S223), the curve detection unit 142 sets the curve as the evaluation target of driving skill evaluation (step S224). In addition, if the maximum value of the yaw angular velocity is not greater than or equal to the predetermined value E in step S223 ("N" in step S223), the curve detection unit 142 does not set the curve as the evaluation target of driving skill evaluation (step S225).

Thereafter, the curve detection unit 142 checks whether all the curves have been selected (step S226). If all the curves have not been selected yet ("N" in step S226), the curve detection unit 142 selects one of the unselected curves (step S227). Thereafter, the process returns to step S221. The curve detection unit 142 repeats the processes in step S221 to S227 until all the curves are selected.

If all the curves have been selected already ("Y" in step S226), the curve detection unit 142 ends this process.

In this manner, the curve detection unit 142 generates the curve data DC by performing the curve division process, as described in step S103 in FIG. 11.

Thereafter, the curve detection unit 142 checks whether there is sample data (step S104). Specifically, the curve detection unit 142 checks whether the data set DSA serving as sample data is stored in the storage 132.

If there is no sample data in step S104 ("N" in step S104), the image generation unit 144 generates the multiple pieces of image data DP, by generating the kernel density estimation image for each of the multiple curves (step S105).

FIG. 14 illustrates an example of a process of generating the kernel density estimation image.

First, the image generation unit 144 performs preprocessing (step S241). Specifically, the image generation unit 44 first calculates time-series data of the longitudinal jerk, by time-differentiating the time-series data of the longitudinal acceleration rate included in the acceleration rate data DA, and calculates time-series data of the square of the longitudinal jerk, based on the time-series data of the longitudinal jerk. In addition, the image generation unit 144 calculates time-series data of the yaw angular acceleration rate, by time-differentiating the time-series data of the yaw angular velocity included in the yaw angular velocity data DY, and calculates time-series data of the square of the yaw angular acceleration rate, based on the time-series data of the yaw angular acceleration rate. The image generation unit 144 generates a preprocessed image, based on the time-series data of the square of the longitudinal jerk and the time-series data of the square of the yaw angular acceleration rate.

FIG. 15 illustrates an example of a process of generating the preprocessed image. The preprocessed image has the horizontal axis (X-axis) representing time, and the vertical axis (Y-axis) representing the square of the yaw angular acceleration rate. In this example, the preprocessed image is divided into 100 regions in an X-axis direction, and is divided into 100 regions in a Y-axis direction. Accordingly, 10000 regions are provided in the preprocessed image.

A full scale in the X-axis direction of the preprocessed image is, for example, set to 5 seconds, assuming traveling time of the vehicle 109 at one curve.

A full scale in the Y-axis direction of the preprocessed image is set based on the time-series data of the square of the yaw angular acceleration rate. The value of the square of the yaw angular acceleration rate generally varies greatly, and can be a greatly deviated value due to, for example, detection accuracy or the like. Accordingly, in this example, the image generation unit 144 performs a process of removing the greatly deviated value, of the values of the square of the yaw angular acceleration rate. The image generation unit 44 may remove the greatly deviated value by using, for example, a box-and-whisker plot. The image generation unit 144 obtains a minimum value and a maximum value of data from which the greatly deviated value has been removed, and decides the full scale in the Y-axis direction in such a manner that a range R of values from the minimum value to the maximum value fits in the Y-axis direction in FIG. 15 with appropriate margins M. The margin M may be, for example, set to about 3% of a width of the values from the minimum value to the maximum value.

For example, when the full scale in the X-axis direction is 5 seconds, and a sampling period of the time-series data is 10 msec, the number of pieces of data in the time-series data of the square of the longitudinal jerk is 500 (=5 sec./10 msec.), and the number of pieces of data in the time-series data of the square of the yaw angular acceleration rate is 500. Note that data related to the deviated value, of these pieces of data, is actually removed as described above. The image generation unit 144 maps the value of the square of the longitudinal jerk on the 10000 regions in the preprocessed image, based on the time and the value of the square of the yaw angular acceleration rate.

In a region where one piece of data is mapped, of the 10000 regions, the image generation unit 144 sets the value of the square of the longitudinal jerk related to the one piece of data as a value of the region. In addition, in a region where multiple pieces of data is mapped, of the 10000 regions, the image generation unit 144 adds up the values of the square of the longitudinal jerk related to the multiple pieces of data, and sets the sum as a value of the region. In this manner, the image generation unit 144 generates the pixel value (Z-axis) of the preprocessed image. The image generation unit 144 performs scaling in such a manner that the pixel value is, for example, an integer greater than or equal to 0 and less than or equal to 255, and that the pixel value is smaller for a larger value of the square of the longitudinal jerk and the pixel value is larger for a smaller value of the square of the longitudinal jerk. In this manner, the image generation unit 144 generates the preprocessed image.

Thereafter, the image generation unit 144 performs the kernel density estimation process based on the preprocessed image, as illustrated in FIG. 14 (step S242). In the kernel density estimation process, based on actual data, intrinsic data including data not observed yet is estimated as density data. The image generation unit 144 performs the kernel density estimation process by a known technique. Thus, the image generation unit 144 generates the kernel density estimation image.

This is the end of this process.

In this manner, the image generation unit 144 generates the multiple pieces of image data DP, by generating the kernel density estimation image for each of the multiple curves, as described in step S105 in FIG. 11.

The data registration unit 149 stores the acceleration rate data DA and the yaw angular velocity data DY generated in step S102, the curve data DC generated in step S103, and the multiple pieces of image data DP generated in step S105, as the data set DSA, in the storage 132 (step S106). This is the end of this process.

If there is sample data in step S104 ("Y" in step S104), the curve detection unit 142 identifies a correspondence between curves, based on similarity between the yaw angular velocity data DY generated in step S102 and the yaw angular velocity data DY of the data set DSA stored in the storage 132, to thereby correct the curve data DC (step S107).

FIG. 16 illustrates an example of the process in step S107.

First, the curve detection unit 142 identifies overall traveling sections to be a processing target, based on the yaw angular velocity data DY generated in step S102 and the yaw angular velocity data DY of the data set DSA (step S261). Specifically, the curve detection unit 142 identifies the overall traveling sections similar to each other by dynamic time warping (DTW: Dynamic Time Wrapping), based on the yaw angular velocity data DY generated in step S102 and the yaw angular velocity data DY of the data set DSA. That is, these pieces of yaw angular velocity data DY are desirably substantially the same, because they are both the time-series data of the yaw angular velocity in the evaluation target area. However, when accuracy of the position of the vehicle 109 obtained by the GNSS is not so high, the yaw angular velocity data DY can include unnecessary data or lack data, at the beginning or the end of the time-series data. Accordingly, the curve detection unit 142 identifies the overall traveling sections that include substantially the same numbers of curves, by dynamic time warping, based on the yaw angular velocity data DY generated in step S102 and the yaw angular velocity data DY of the data set DSA. This makes the yaw angular velocity data DY generated in step S102 and the yaw angular velocity data DY of the data set DSA comparable with each other in the overall traveling sections. The curve detection unit 142 identifies the overall traveling sections to be the processing target in this manner.

Thereafter, the curve detection unit 142 identifies the correspondence between curves, between multiple curves in the overall traveling section to be the processing target obtained based on the yaw angular velocity data DY generated in step S102, and multiple curves in the overall traveling section to be the processing target obtained based on the yaw angular velocity data DY of the data set DSA (step S262). Specifically, the curve detection unit 142 identifies the correspondence between the curves, by identifying each of multiple sections similar to each other by dynamic time warping, based on the yaw angular velocity data DY generated in step S102 and the yaw angular velocity data DY of the data set DSA.

FIG. 17 illustrates an example of the process in step S262, in which (A) illustrates the yaw angular velocity data DY generated in step S102, and (B) illustrates the yaw angular velocity data DY of the data set DSA. FIG. 17 illustrates the yaw angular velocity data DY in a portion of the traveling sections to be the processing target. In FIG. 17, numbers denote the curve numbers in the curve data DC.

These two pieces of yaw angular velocity data DY have a difference in a portion W1. That is, in the yaw angular velocity data DY illustrated in (A) of FIG. 17, one curve with a curve number of "6" is detected in the portion W1. In contrast, in the yaw angular velocity data DY illustrated in (B) of FIG. 17, three curves with curve numbers of "6" to "8" are detected in the portion W1.

Accordingly, in this example, the curve detection unit 142 changes the curve number of the curve in the portion W1 from "6" to "6, 7, 8", and changes the curve number of the curve after this curve, in the yaw angular velocity data DY generated in step S102 ((A) of FIG. 17). That is, the curve detection unit 142 identifies the correspondence between the curves in such a manner that the curve numbers of the multiple curves in the yaw angular velocity data DY generated in step S102 ((A) of FIG. 17) match the curve numbers of the multiple curves in the yaw angular velocity data DY of the data set DSA ((B) of FIG. 17). The curve detection unit 142 corrects the curve data DC generated in step S103, based on this processing result.

Thereafter, the curve detection unit 142 excludes curves with a low similarity level, between the multiple curves in the yaw angular velocity data DY generated in step S102 and the multiple curves in the yaw angular velocity data DY of the data set DSA, from the evaluation target of driving skill evaluation (step S263). Specifically, the curve detection unit 142 calculates, by dynamic time warping, each similarity level between the curves having correspondence with each other, of the multiple curves in the yaw angular velocity data DY generated in step S102 and the multiple curves in the yaw angular velocity data DY of the data set DSA. The curve detection unit 142 excludes curves with a similarity level lower than a predetermined amount, from the evaluation target of driving skill evaluation.

This is the end of this process.

In this manner, the curve detection unit 142 identifies the correspondence between the curves, based on the similarity between the yaw angular velocity data DY generated in step S102 and the yaw angular velocity data DY of the data set DSA, to thereby correct the curve data DC, as described in step S107 in FIG. 11.

Thereafter, the image generation unit 144 generates the multiple pieces of image data DP, by generating the kernel density estimation image for each of the multiple curves (step S108). This process is similar to the process in step S105.

The data registration unit 149 stores the acceleration rate data DA and the yaw angular velocity data DY generated in step S102, the curve data DC generated in step S103 and corrected in step S107, and the multiple pieces of image data DP generated in step S108, as the data set DSB, in the storage 132 (step S109). This is the end of this process.

In this manner, the data processing system 2 generates the data set DS including the acceleration rate data DA, the yaw angular velocity data DY, the curve data DC, and the multiple pieces of image data DP, based on the traveling data obtained by the skilled driver driving the vehicle 109. By repeating such processes, it is possible for the data processing system 2 to generate the multiple data sets DS, based on multiple pieces of traveling data.

(Generation of Evaluation Target Curve Data DTC)

In the above description, the data processing system 2 performs processing based on the traveling data obtained by the skilled driver driving the vehicle 109. It is also possible to, for example, perform processing based on traveling data obtained by an unskilled driver driving the vehicle 109. This makes it possible for the data processing system 2 to obtain a kernel density estimation image related to the skilled driver, and a kernel density estimation image related to the unskilled driver.

The kernel density estimation image can change in accordance with the driving skill of the driver. As will be described later, the driving skill evaluation system 1 evaluates the driving skill of the driver, based on the kernel density estimation image. At a given curve, for example, there can be a great difference between the kernel density estimation image related to the skilled driver and the kernel density estimation image related to the unskilled driver. At another given curve, for example, there can be little difference between the kernel density estimation image related to the skilled driver and the kernel density estimation image related to the unskilled driver. Accordingly, the driving skill evaluation system 1 uses a curve where there is a great difference between the kernel density estimation image related to the skilled driver and the kernel density estimation image related to the unskilled driver, as the evaluation target of driving skill evaluation.

A process of generating the evaluation target curve data DTC by deciding the curve to be the evaluation target of driving skill evaluation is described in detail below.

FIG. 18 illustrates an example of the process of generating the evaluation target curve data DTC. In this example, the data processing system 2 has already acquired the multiple data sets DS related to the skilled driver and the multiple data sets DS related to the unskilled driver.

The evaluation target data generation unit 147 selects one of the multiple curves (step S301).

Thereafter, the image similarity level calculation unit 145 calculates an average value F1 of image similarity levels between multiple kernel density estimation images related to the skilled driver and multiple kernel density estimation images related to the unskilled driver, at the selected one curve (step S302). Specifically, the image similarity level calculation unit 145 calculates the image similarity level between the kernel density estimation images, for all combinations between the multiple kernel density estimation images related to one or more skilled drivers and the multiple kernel density estimation images related to one or more unskilled drivers, at the selected one curve. The image similarity level calculation unit 145 calculates the average value F1 of these image similarity levels.

Thereafter, the image similarity level calculation unit 145 calculates an average value F2 of image similarity levels between the multiple kernel density estimation images related to the skilled driver, at the selected one curve (step S303). Specifically, the image similarity level calculation unit 145 calculates the image similarity level between the kernel density estimation images, for all combinations between the multiple kernel density estimation images related to the one or more skilled drivers, at the selected one curve. The image similarity level calculation unit 145 calculates the average value F2 of these image similarity levels.

Thereafter, the evaluation target data generation unit 147 checks whether there is a significant difference between the average value F1 and the average value F2 (step S304). Specifically, when the difference between the average value F1 and the average value F2 is greater than or equal to a predetermined amount, the evaluation target data generation unit 147 determines that there is a significant difference between the average value F1 and the average value F2. If there is a significant difference between the average value F1 and the average value F2 ("Y" in step S304), the evaluation target data generation unit 147 sets the curve selected in step S301 as the evaluation target of driving skill evaluation (step S305). If there is no significant difference between the average value F1 and the average value F2 ("N" in step S304), the evaluation target data generation unit 147 does not set the curve selected in step S301 as the evaluation target of driving skill evaluation (step S306).

Thereafter, the evaluation target data generation unit 147 checks whether all the curves have been selected (step S307). If all the curves have not been selected yet ("N" in step S307), the evaluation target data generation unit 147 selects one of the unselected curves (step S308). Thereafter, the process returns to step S302. The evaluation target data generation unit 147 repeats the processes in steps S302 to S308 until all the curves are selected.

If all the curves have been selected in step S307 ("Y" in step S307), the evaluation target data generation unit 147 generates the evaluation target curve data DTC based on a processing result of steps S305 and S306 (step S309). Specifically, the evaluation target data generation unit 147 generates the evaluation target curve data DTC including the curve number of the curve set as the evaluation target of driving skill evaluation in steps S305 and S306.

This is the end of this process.

In this manner, the data processing system 2 generates the evaluation target curve data DTC, based on the traveling data obtained by the skilled driver and the unskilled driver driving the vehicle 109.

The data processing system 2 transmits the multiple data sets DS, the evaluation target curve data DTC, and the area data DAR to the server apparatus 30. The server apparatus 30 stores these pieces of data in the storage 32.

Note that, in this example, the processor 140 determines whether to use the selected curve as the evaluation target, by calculating the average values F1 and F2 and checking whether there is a significant difference between the average value F1 and the average value F2 in steps S302 to S304, but this is non-limiting. Alternatively, the processor 140 may determine whether to use the selected curve as the evaluation target by performing, for example, processing of a non-parametric U test, based on multiple image similarity levels used for calculation of the average value F1 and multiple image similarity levels used for calculation of the average value F2, for example, without using the average values F1 and F2. Specifically, first, as in step S302, the image similarity level calculation unit 145 calculates the image similarity level between the kernel density estimation images, for all combinations between the multiple kernel density estimation images related to one or more skilled drivers and the multiple kernel density estimation images related to one or more unskilled drivers, at the selected one curve. Thereafter, as in step S303, the image similarity level calculation unit 145 calculates the image similarity level between the kernel density estimation images, for all combinations between the multiple kernel density estimation images related to the one or more skilled drivers, at the selected one curve. The evaluation target data generation unit 147 performs, for example, processing of the non-parametric U test, based on the multiple image similarity levels obtained in the first step and the multiple image similarity levels obtained in the subsequent step, to thereby determine whether there is a significant difference between the multiple image similarity levels obtained in the first step and the multiple image similarity levels obtained in the subsequent step. If there is a significant difference, the evaluation target data generation unit 147 sets the curve selected in step S301 as the evaluation target of driving skill evaluation (step S305). If there is no significant difference ("N" in step S304), the evaluation target data generation unit 147 does not set the curve selected in step S301 as the evaluation target of driving skill evaluation (step S306).

(Evaluation of Driving Skill)

The driving skill evaluation system 1 evaluates the driving skill of the driver, based on the traveling data generated by the driver driving the vehicle 9, by using the multiple data sets DS, the evaluation target curve data DTC, and the area data DAR stored in the storage 32 of the server apparatus 30. This operation is described in detail below.

When the driver drives the vehicle 9, in the vehicle 9, the acceleration sensor 14 of the smartphone 10 detects each of the acceleration rates in the three directions in the coordinate system of the smartphone 10, the angular velocity sensor 15 detects each of the three angular velocities (the yaw angular velocity, the roll angular velocity, and the pitch angular velocity) in the coordinate system of the smartphone 10, and the GNSS receiver 16 acquires the position of the vehicle 9 on the ground.

The data processing unit 21 performs predetermined data processing such as filtering, based on the detection result of the acceleration sensor 14 and the detection result of the angular velocity sensor 15. Specifically, the data processing unit 21 performs filtering on the time-series data of the acceleration rate detected by the acceleration sensor 14, and performs filtering on the time-series data of the angular velocity detected by the angular velocity sensor 15. Note that this is non-limiting, and the data processing unit 21 may perform down-sampling on these pieces of time-series data subjected to filtering.

After the end of traveling, the communicator 13 transmits the time-series data of the acceleration rate and the time-series data of the angular velocity processed by the data processing unit 21, to the server apparatus 30, together with the time-series data of the position of the vehicle 9 obtained by the GNSS receiver 16.

In the server apparatus 30, the communicator 31 receives the data transmitted from the smartphone 10. The server apparatus 30 evaluates the driving skill of the driver, based on the data received by the communicator 31. This operation of the server apparatus 30 is described in detail below.

FIGS. 19A and 19B illustrate an operation example of the server apparatus 30.

First, the data processing unit 41 of the server apparatus 30 checks whether the vehicle 9 has traveled in the evaluation target area, by using the area data DAR stored in the storage 32, based on the time-series data of the position of the vehicle 9 (step S401). If the vehicle 9 has not traveled in the evaluation target area ("N" in step S401), this process ends.

If the vehicle 9 has traveled in the evaluation target area ("Y" in step S401), the data processing unit 41 generates the time-series data of the longitudinal acceleration rate and the time-series data of the yaw angular velocity by performing coordinate transformation (step S402). Specifically, the data processing unit 41 generates the time-series data of the acceleration rate (the longitudinal acceleration rate) in the traveling direction of the vehicle 9, by performing coordinate transformation based on the time-series data of the acceleration rate in the evaluation target area. In addition, the data processing unit 41 generates the time-series data of the yaw angular velocity of the vehicle 9, by performing coordinate transformation based on the time-series data of the angular velocity in the evaluation target area. Note that this is non-limiting. For example, when down-sampling has been performed in the smartphone 10, the data processing unit 41 may perform up-sampling on the time-series data of the acceleration rate and the time-series data of the angular velocity received by the communicator 31, and perform coordinate transformation based on the time-series data of the longitudinal acceleration rate and the time-series data of the yaw angular velocity subjected to up-sampling.

Thereafter, the data processing unit 41 generates the acceleration rate data DA1 and the yaw angular velocity data DY1 respectively by performing filtering on the time-series data of the longitudinal acceleration rate and the time-series data of the yaw angular velocity generated in step S402 (step S403).

Thereafter, the curve detection unit 42 generates the curve data DC1 by performing the curve division process based on the yaw angular velocity data DY1 generated in step S403 (step S404). This curve division process is similar to the process in step S103 illustrated in FIG. 11.

Thereafter, the curve detection unit 42 identifies a correspondence between curves, based on similarity between the yaw angular velocity data DY1 generated in step S403 and the yaw angular velocity data DY of the data set DSA stored in the storage 32, to thereby correct the curve data DC1 (step S405). This process is similar to the process in step S107 illustrated in FIG. 11.

The data extraction unit 43 extracts, based on the evaluation target curve data DTC stored in the storage 32, the time-series data of the longitudinal acceleration rate and the time-series data of the yaw angular velocity related to the curve serving as the evaluation target of driving skill evaluation (step S406). Specifically, the data extraction unit 43 extracts the time-series data of the longitudinal acceleration rate related to multiple curves to be used for evaluation of the driving skill, of the time-series data of the longitudinal acceleration rate included in the acceleration rate data DA1. In addition, the data extraction unit 43 extracts the time-series data of the yaw angular velocity related to multiple curves to be used for evaluation of the driving skill, of the time-series data of the yaw angular velocity included in the yaw angular velocity data DY1.

Thereafter, the image generation unit 44 generates the multiple pieces of image data DP, by generating the kernel density estimation image for each of the multiple curves, based on the time-series data of the longitudinal acceleration rate and the time-series data of the yaw angular velocity extracted in step S406 (step S407). This process is similar to the process in step S108. In step S406, the image generation unit 44 generates the kernel density estimation image related to the curve serving as the evaluation target of driving skill evaluation.

Thereafter, the image similarity level calculation unit 45 calculates the average value of the image similarity levels (the average similarity level), based on the multiple kernel density estimation images generated in step S407, and the multiple kernel density estimation images included in the multiple data sets DS related to the skilled driver and stored in the storage 32 (step S408). Specifically, the image similarity level calculation unit 45 calculates each image similarity level by comparing, for one of the multiple curves, the kernel density estimation image generated by the image generation unit 44 with the multiple kernel density estimation images included in the multiple data sets DS related to the skilled driver. The image similarity level calculation unit 45 calculates multiple image similarity levels by performing this process for each of the multiple curves. The image similarity level calculation unit 45 calculates the average value of these multiple image similarity levels (the average similarity level). In this example, a value of the image similarity level is a positive value, the value of the image similarity level is smaller for more similar kernel density estimation images, and the value of the image similarity level is larger for less similar kernel density estimation images.

Thereafter, the skill determination unit 46 checks whether the number of curves detected by the curve detection unit 42 in steps S404 and S405 is greater than or equal to a predetermined number G1 (step S409). That is, when detecting curves in steps S404 and S405, the curve detection unit 42 can fail to detect some of the curves depending on the yaw angular velocity data DY1. For example, when the driving skill of the driver is low and the yaw angular velocity data DY1 is greatly different from the yaw angular velocity data DY of the skilled driver, a large number of curves can be undetectable. Accordingly, the skill determination unit 46 checks whether the number of curves detected based on the yaw angular velocity data DY1 is greater than or equal to the predetermined number G1.

If the number of detected curves is greater than or equal to the predetermined number G1 in step S409 ("Y" in step S109), the skill determination unit 46 checks whether a value of the average similarity level calculated in step S408 is less than a threshold G2 (step S410).

If the value of the average similarity level is less than the threshold G2 in step S410 ("Y" in step S410), the skill determination unit 46 determines that the driver of the vehicle 9 has a high driving skill (step S411). That is, because the value of the average similarity level is less than the threshold G2 in step S410, the kernel density estimation image of the driver is similar to the kernel density estimation image of the skilled driver. Accordingly, the skill determination unit 46 determines that the driver of the vehicle 9 has a high driving skill.

If the number of detected curves is not greater than or equal to the predetermined number G1 in step S409 ("N" in step S409), or if the value of the average similarity level is not less than the threshold G2 in step S410 ("N" in step S410), the skill determination unit 46 determines that the driver of the vehicle 9 has a low skill level (step S412). That is, if the number of detected curves is not greater than or equal to the predetermined number G1 in step S409, the skill determination unit 46 determines that the driver has a low driving skill, because the yaw angular velocity data DY1 of the driver is greatly different from the yaw angular velocity data DY of the skilled driver. In addition, if the value of the average similarity level is not less than the threshold G2 in step S410, the skill determination unit 46 determines that the driver has a low driving skill, because the kernel density estimation image of the driver is not similar to the kernel density estimation image of the skilled driver.

This is the end of this process.

The communicator 31 of the server apparatus 30 transmits data including the evaluation result of the driving skill to the smartphone 10. The communicator 13 of the smartphone 10 receives the data transmitted from the smartphone 10. The display processing unit 22 performs display processing, based on the data indicating the evaluation result of the driving skill and transmitted from the server apparatus 30. The touch panel 11 displays the evaluation result of the driving skill. This makes it possible for the driver to obtain an objective evaluation about the own driving skill.

As described above, the driving skill evaluation method in the driving skill evaluation system 1 includes: generating a kernel density estimation image, based on time-series data of a first parameter (the square of the yaw angular velocity in this example) corresponding to a direction change in the traveling direction of the vehicle 9, and time-series data of a second parameter indicating the square of the jerk (the longitudinal jerk) in the traveling direction of the vehicle 9; and evaluating the driving skill of the driver of the vehicle, by comparing the kernel image estimation image with a reference image related to the skilled driver. Thus, the driving skill evaluation method makes it possible to enhance the evaluation accuracy of the driving skill of the driver. That is, in the kernel density estimation process, based on actual data, intrinsic data including data not observed yet is estimated as density data. This allows the kernel image estimation image to include an intrinsic feature unique to the driver, corresponding to the driving skill of the driver. Accordingly, in the driving skill evaluation method, using the kernel image estimation image makes it possible to enhance the evaluation accuracy of the driving skill of the driver.

In addition, in the driving skill evaluation method, because the kernel density estimation image is generated based on the time-series data of the second parameter indicating the square of the jerk in the traveling direction of the vehicle 9, it is possible to enhance the evaluation accuracy of the driving skill of the driver. That is, for example, when the kernel density estimation image is generated based on the time-series data of the acceleration rate (the longitudinal acceleration rate) in the traveling direction of the vehicle 9, the pixel value of the preprocessed image can be negative, and the kernel density estimation process is thus unable to be performed. In addition, for example, as illustrated in FIG. 20, the longitudinal acceleration rate is susceptible to influence of a gravitational acceleration rate at, for example, a slope or the like, which causes a trend in the longitudinal acceleration rate. Accordingly, for example, when the kernel density estimation image is generated based on time-series data of an absolute value of the longitudinal acceleration rate, the kernel density estimation image is subjected to the influence of the gravitational acceleration rate, which can cause the evaluation accuracy of the driving skill of the driver to decrease. In contrast, in the driving skill evaluation method, the kernel density estimation image is generated based on the time-series data of the second parameter indicating the square of the jerk (the longitudinal jerk) in the traveling direction of the vehicle 9. Specifically, the longitudinal jerk is calculated by time-differentiating the longitudinal acceleration rate, the square of the longitudinal jerk is calculated, and the kernel density estimation image is generated based on the time-series data of the square of the longitudinal jerk. Thus, it is possible to make the pixel value of the preprocessed image positive, allowing for suppression of the influence of the gravitational acceleration rate. This makes it possible to enhance the evaluation accuracy of the driving skill of the driver.

In addition, in the driving skill evaluation method, the time-series data of the first parameter (the square of the yaw angular velocity in this example) and the time-series data of the second parameter (the square of the longitudinal jerk in this example) include data regarding when the vehicle 9 is traveling at a curve. The driver performs various operations including a steering operation, a braking operation, and an acceleration operation at a curve, and time-series data at the curve thus includes information regarding the driver's various operations. Accordingly, the driving skill evaluation method makes it possible to enhance the evaluation accuracy of the driving skill of the driver.

In addition, in the driving skill evaluation method, as illustrated in FIGS. 6 and 7, a first image direction in the kernel density estimation image represents time, a second image direction in the kernel density estimation image represents the first parameter (the square of the yaw angular velocity in this example), and the pixel value of the kernel density estimation image corresponds to data of the second parameter (the square of the longitudinal jerk in this example). Thus, for example, in a traveling course with a large change in the speed of the vehicle 9, it is possible to enhance the evaluation accuracy of the driving skill of the driver. That is, for example, in a traveling course with steep slopes, the change in the speed of the vehicle 9 is large, and the value of the square of the longitudinal jerk can change greatly, which can cause the pixel value of the kernel density estimation image to change greatly. Accordingly, in the driving skill evaluation method, it is possible to enhance the evaluation accuracy of the driving skill of the driver particularly in a traveling course with a large change in the speed of the vehicle 9.

In addition, the driving skill evaluation method further includes presenting the evaluation result of the driving skill of the driver to the driver. This makes it possible for the driver to obtain an objective evaluation about the own driving skill. Consequently, it is possible for the driver to pay attention to his/her own driving, and to improve the own driving skill.

Effects

As described above, in the present embodiment, the driving skill evaluation method includes: generating a kernel density estimation image, based on time-series data of a first parameter corresponding to a direction change in the traveling direction of the vehicle, and time-series data of a second parameter indicating the square of the jerk in the traveling direction of the vehicle; and evaluating the driving skill of the driver of the vehicle, by comparing the kernel image estimation image with a reference image related to the skilled driver. This makes it possible to enhance the evaluation accuracy of the driving skill of the driver.

In the present embodiment, because the kernel density estimation image is generated based on the time-series data of the second parameter indicating the square of the jerk in the traveling direction of the vehicle, it is possible to enhance the evaluation accuracy of the driving skill of the driver.

In the present embodiment, the time-series data of the first parameter and the time-series data of the second parameter include data regarding when the vehicle is traveling at a curve. This makes it possible to enhance the evaluation accuracy of the driving skill of the driver.

In the present embodiment, a first image direction in the kernel density estimation image represents time, a second image direction in the kernel density estimation image represents the first parameter, and the pixel value of the kernel density estimation image corresponds to data of the second parameter. Thus, for example, it is possible to enhance the evaluation accuracy of the driving skill of the driver in a traveling course with a large change in the speed of the vehicle.

In the present embodiment, the driving skill evaluation method further includes presenting the evaluation result of the driving skill of the driver to the driver. This makes it possible for the driver to obtain an objective evaluation about the own driving skill. Consequently, it is possible for the driver to pay attention to his/her own driving, and to improve the own driving skill.

Modification Example 1

In the embodiment described above, the vertical axis (Y-axis) of the kernel density estimation image represents the square of the yaw angular acceleration rate, as illustrated in FIGS. 6 and 7, but this is non-limiting. Alternatively, for example, the vertical axis (Y-axis) of the kernel density estimation image may represent the yaw angular acceleration rate as illustrated in FIG. 21, or represent an absolute value of the yaw angular acceleration rate. In addition, for example, the vertical axis (Y-axis) of the kernel density estimation image may represent the yaw angular velocity as illustrated in FIG. 22, or represent an absolute value of the yaw angular velocity. In addition, the vertical axis (Y-axis) of the kernel density estimation image may represent a square of an acceleration rate (a lateral acceleration rate) in a direction intersecting the traveling direction of the vehicle as illustrated in FIG. 23, represent the lateral acceleration rate as illustrated in FIG. 24, or represent an absolute value of the lateral acceleration rate.

Modification Example 2

In the embodiment described above, the vertical axis (Y-axis) of the kernel density estimation image represents the square of the yaw angular acceleration rate, and the pixel value (Z-axis) of the kernel density estimation image represents the square of the longitudinal jerk, as illustrated in FIGS. 6 and 7, but this is non-limiting. Alternatively, for example, the vertical axis (Y-axis) of the kernel density estimation image may represent the square of the longitudinal jerk, and the pixel value (Z-axis) of the kernel density estimation image may represent the square of the yaw angular acceleration rate, as illustrated in FIGS. 25 and 26. FIG. 25 illustrates an example of the kernel density estimation image at a given curve. FIG. 26 illustrates coordinate axes of the kernel density estimation image illustrated in FIG. 25. Thus, for example, particularly in a traveling course with a small change in the speed of the vehicle 9, it is possible to enhance the evaluation accuracy of the driving skill of the driver. That is, for example, in a traveling course with gentle slopes, the change in the speed of the vehicle 9 is small and the value of the square of the longitudinal jerk tends not to change greatly. Thus, the pixel value of the kernel density estimation image illustrated in FIGS. 6 and 7 tends not to change greatly. In such a case, using the kernel density estimation image illustrated in FIGS. 25 and 26 makes it possible to enhance the evaluation accuracy of the driving skill of the driver.

The driving skill evaluation system 1 may be able to perform the process based on both the kernel density estimation image illustrated in FIGS. 6 and 7 and the kernel density estimation image illustrated in FIGS. 25 and 26. For example, the information processing apparatus 130 of the data processing system 2 may decide, based on the engineer's operation, whether to generate the kernel density estimation image illustrated in FIGS. 6 and 7 or generate the kernel density estimation image illustrated in FIGS. 25 and 26. In addition, the information processing apparatus 130 may decide which of these kernel density estimation images is to be generated, based on the acceleration rate data DA including the time-series data of the longitudinal acceleration rate and the yaw angular velocity data DY including the time-series data of the yaw angular velocity. Specifically, the information processing apparatus 130 checks whether the traveling course traveled by the vehicle 109 is a traveling course with a large change in the speed of the vehicle 109, based on the acceleration rate data DA and the yaw angular velocity data DY. If the traveling course traveled by the vehicle 109 is a traveling course with a large change in the speed of the vehicle 109, the information processing apparatus 130 decides to generate the kernel density estimation image illustrated in FIGS. 6 and 7. If the traveling course traveled by the vehicle 109 is not a traveling course with a large change in the speed of the vehicle 109, the information processing apparatus 130 decides to generate the kernel density estimation image illustrated in FIGS. 25 and 26.

The information processing apparatus 130 may decide to generate the kernel density estimation image illustrated in FIGS. 6 and 7 for all the curves, or decide to generate the kernel density estimation image illustrated in FIGS. 25 and 26 for all the curves. The information processing apparatus 130 may individually decide, for each of the multiple curves, which kernel density estimation image is to be generated, of the kernel density estimation image illustrated in FIGS. 6 and 7 and the kernel density estimation image illustrated in FIGS. 25 and 26.

When the kernel density estimation image related to the skilled driver in the data set DS is the kernel density estimation image illustrated in FIGS. 6 and 7, the server apparatus 30 generates the kernel density estimation image illustrated in FIGS. 6 and 7, based on the traveling data regarding the driver. When the kernel density estimation image related to the skilled driver in the data set DS is the kernel density estimation image illustrated in FIGS. 25 and 26, the server apparatus 30 generates the kernel density estimation image illustrated in FIGS. 25 and 26, based on the traveling data regarding the driver.

In addition, in the example in FIGS. 25 and 26, the pixel value (Z-axis) of the kernel density estimation image represents the square of the yaw angular acceleration rate, but this is non-limiting. Alternatively, for example, the pixel value (Z-axis) of the kernel density estimation image may represent the absolute value of the yaw angular acceleration rate, represent the square of the lateral acceleration rate, or represent the absolute value of the lateral acceleration rate, as in Modification Example 1.

Modification Example 3

In the embodiment described above, the smartphone 10 transmits the time-series data of the acceleration rate, the time-series data of the angular velocity, and the time-series data of the position of the vehicle 9 to the server apparatus 30, as illustrated in FIG. 2, but this is non-limiting. Alternatively, for example, the smartphone 10 may further transmit time-series data of geomagnetism to the server apparatus 30. This example is described in detail below.

FIG. 27 illustrates a configuration example of a smartphone 10A according to the present modification example. The smartphone 10A includes a geomagnetic sensor 17A and a processor 20A. The geomagnetic sensor 17A is configured to detect geomagnetism. The processor 20A collects the time-series data of the acceleration rate detected by the acceleration sensor 14, the time-series data of the angular velocity detected by the angular velocity sensor 15, the time-series data of the position of the vehicle 9 obtained by the GNSS receiver 16, and time-series data of the geomagnetism detected by the geomagnetic sensor 17A. After the end of traveling, the communicator 13 transmits the time-series data of the acceleration rate and the time-series data of the angular velocity processed by the data processing unit 21, to the server apparatus 30, together with the time-series data of the position of the vehicle 9 obtained by the GNSS receiver 16 and the time-series data of the geomagnetism detected by the geomagnetic sensor 17A.

The data processing unit 41 of the server apparatus 30 generates the time-series data of the acceleration rate (the longitudinal acceleration rate) in the traveling direction of the vehicle 9, by performing coordinate transformation based on the time-series data of the acceleration rate received by the communicator 31. In addition, the data processing unit 41 generates the time-series data of the yaw angular velocity of the vehicle 9, by performing coordinate transformation based on the time-series data of the angular velocity received by the communicator 31. The data processing unit 41 corrects the time-series data of the longitudinal acceleration rate and the time-series data of the yaw angular velocity, based on the time-series data of the geomagnetism received by the communicator 31. This makes it possible to enhance accuracy of the time-series data of the longitudinal acceleration rate and the time-series data of the yaw angular velocity.

Other Modification Examples

Two or more of these modification examples may be combined.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the embodiment described above, the server apparatus 30 evaluates the driving skill based on the traveling data transmitted from the smartphone 10, but this is non-limiting. Alternatively, for example, the smartphone 10 may evaluate the driving skill based on the traveling data. In this case, the processor 20 of the smartphone 10 may operate as the data processing unit 41, the curve detection unit 42, the data extraction unit 43, the image generation unit 44, the image similarity level calculation unit 45, and the skill determination unit 46. In addition, the storage 12 of the smartphone 10 holds the multiple data sets DS (the data set DSA and the multiple data sets DSB), the evaluation target curve data DTC, and the area data DAR.

An in-vehicle apparatus of the vehicle 9 may collect the traveling data of the vehicle 9, and evaluate the driving skill based on the traveling data. Like the in-vehicle apparatus 110 (FIG. 9), the in-vehicle apparatus of the vehicle 9 collects the time-series data of the longitudinal acceleration rate detected by the acceleration sensor, the time-series data of the yaw angular velocity detected by the yaw angular velocity sensor, and the time-series data of the position of the vehicle 9 obtained by the GNSS receiver. A processor of the in-vehicle apparatus of the vehicle 9 may operate as the data processing unit 41, the curve detection unit 42, the data extraction unit 43, the image generation unit 44, the image similarity level calculation unit 45, and the skill determination unit 46. In addition, a storage of the in-vehicle apparatus holds the multiple data sets DS (the data set DSA and the multiple data sets DSB), the evaluation target curve data DTC, and the area data DAR.

The effects described herein are mere examples, and effects of the disclosure are therefore not limited to those described herein. Accordingly, the disclosure may achieve any other effect.

The disclosure may also encompass the following embodiments.

(1)
A driving skill evaluation method including:
generating a kernel density estimation image, based on time-series data of a first parameter corresponding to a direction change in a traveling direction of a vehicle, and time-series data of a second parameter indicating a square of a jerk in the traveling direction of the vehicle; and
evaluating a driving skill of a driver of the vehicle, by comparing the kernel density estimation image with a reference image.

(2)
The driving skill evaluation method according to (1), in which the time-series data of the first parameter and the time-series data of the second parameter include data regarding when the vehicle is traveling at a curve.

(3)
The driving skill evaluation method according to (1) or (2), in which
a first image direction in the kernel density estimation image represents time,
a second image direction in the kernel density estimation image represents the first parameter, and
a pixel value of the kernel density estimation image corresponds to data of the second parameter.

(4)
The driving skill evaluation method according to any one of (1) to (3), in which the first parameter includes a parameter related to a yaw angular velocity.

(5)
The driving skill evaluation method according to (4), in which the first parameter includes a parameter related to a yaw angular acceleration rate.

(6)
The driving skill evaluation method according to (5), in which the first parameter includes a parameter related to a square of the yaw angular acceleration rate.

(7)
The driving skill evaluation method according to any one of (1) to (3), in which the first parameter includes a parameter related to a lateral acceleration rate.

(8)
The driving skill evaluation method according to (1) or (2), in which
a first image direction in the kernel density estimation image represents time,
a second image direction in the kernel density estimation image represents the second parameter, and
a pixel value of the kernel density estimation image corresponds to data of the first parameter.

(9)
The driving skill evaluation method according to any one of (1) to (8), further including presenting an evaluation result of the driving skill of the driver to the driver.

(10)
A driving skill evaluation system including:
an image generation circuit that generates a kernel density estimation image, based on time-series data of a first parameter corresponding to a direction change in a traveling direction of a vehicle, and time-series data of a second parameter indicating a square of a jerk in the traveling direction of the vehicle; and
an evaluation circuit that evaluates a driving skill of a driver of the vehicle, by comparing the kernel density estimation image with a reference image.

(11)
A recording medium containing software, the software causing a processor to:
generate a kernel density estimation image, based on time-series data of a first parameter corresponding to a direction change in a traveling direction of a vehicle, and time-series data of a second parameter indicating a square of a jerk in the traveling direction of the vehicle; and
evaluate a driving skill of a driver of the vehicle, by comparing the kernel density estimation image with a reference image.

The processor 40 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 40 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 40 illustrated in FIG. 3.

The invention claimed is:

1. A driving skill evaluation method comprising:
generating a kernel density estimation image, based on time-series data of a first parameter corresponding to a direction change in a traveling direction of a vehicle, and time-series data of a second parameter indicating a square of a jerk in the traveling direction of the vehicle; and
evaluating a driving skill of a driver of the vehicle, by comparing the kernel density estimation image with a reference image.

2. The driving skill evaluation method according to claim 1, wherein the time-series data of the first parameter and the time-series data of the second parameter comprise data regarding when the vehicle is traveling at a curve.

3. The driving skill evaluation method according to claim 1, wherein
a first image direction in the kernel density estimation image represents time,
a second image direction in the kernel density estimation image represents the first parameter, and
a pixel value of the kernel density estimation image corresponds to data of the second parameter.

4. The driving skill evaluation method according to claim 1, wherein the first parameter comprises a parameter related to a yaw angular velocity.

5. The driving skill evaluation method according to claim 4, wherein the first parameter comprises a parameter related to a yaw angular acceleration rate.

6. The driving skill evaluation method according to claim 5, wherein the first parameter comprises a parameter related to a square of the yaw angular acceleration rate.

7. The driving skill evaluation method according to claim 1, wherein the first parameter comprises a parameter related to a lateral acceleration rate.

8. The driving skill evaluation method according to claim 1, wherein
a first image direction in the kernel density estimation image represents time,
a second image direction in the kernel density estimation image represents the second parameter, and
a pixel value of the kernel density estimation image corresponds to data of the first parameter.

9. The driving skill evaluation method according to claim 1, further comprising presenting an evaluation result of the driving skill of the driver to the driver.

10. A driving skill evaluation system comprising:
an image generation circuit configured to generate a kernel density estimation image, based on time-series data of a first parameter corresponding to a direction change in a traveling direction of a vehicle, and time-series data of a second parameter indicating a square of a jerk in the traveling direction of the vehicle; and
an evaluation circuit configured to evaluate a driving skill of a driver of the vehicle, by comparing the kernel density estimation image with a reference image.

11. A non-transitory recording medium containing software, the software causing a processor to:
generate a kernel density estimation image, based on time-series data of a first parameter corresponding to a direction change in a traveling direction of a vehicle, and time-series data of a second parameter indicating a square of a jerk in the traveling direction of the vehicle; and
evaluate a driving skill of a driver of the vehicle, by comparing the kernel density estimation image with a reference image.

* * * * *